(12) United States Patent
Wolf et al.

(10) Patent No.: US 11,790,292 B2
(45) Date of Patent: *Oct. 17, 2023

(54) SCHEDULED THERMAL CONTROL SYSTEM

(71) Applicant: Lineage Logistics, LLC, Irvine, CA (US)

(72) Inventors: Elliott Gerard Wolf, Oakland, CA (US); Alexander James Woolf, San Francisco, CA (US)

(73) Assignee: Lineage Logistics, LLC, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/840,902

(22) Filed: Jun. 15, 2022

(65) Prior Publication Data

US 2022/0309422 A1 Sep. 29, 2022

Related U.S. Application Data

(63) Continuation of application No. 16/724,801, filed on Dec. 23, 2019, now Pat. No. 11,367,028, which is a
(Continued)

(51) Int. Cl.
*G06Q 10/0631* (2023.01)
*G06Q 50/28* (2012.01)
*G06Q 10/087* (2023.01)

(52) U.S. Cl.
CPC ..... *G06Q 10/06311* (2013.01); *G06Q 10/087* (2013.01); *G06Q 50/28* (2013.01)

(58) Field of Classification Search
CPC ............. F25D 13/00; F25D 2500/04; F25D 2700/123; F25D 29/00; G05B 13/042
See application file for complete search history.

(56) References Cited

U.S. PATENT DOCUMENTS 4,807,443 A * 2/1989 Battson ............... F25D 29/00
 62/65
5,404,516 A * 4/1995 Georgiades ............ G06Q 10/06
 718/104
(Continued)

FOREIGN PATENT DOCUMENTS

CN 104969133 10/2015
EP 2954377 12/2015
WO WO 2014124353 8/2014

OTHER PUBLICATIONS

Hovgard et al., "Fast Nonconvex Model Predictive Control for Commercial Refrigeration," IFAC the 2012 IFAC Workshop on Automatic Control in Offshore Oil and Gas Production, vol. 45, No. 17, Jan. 1, 2012 (Jan. 1, 2012), pp. 514-521, DOI: 10.3182/20120823-5-NL-3013.00082.
(Continued)

*Primary Examiner* — Henry T Crenshaw
(74) *Attorney, Agent, or Firm* — Barnes & Thornburg LLP

(57) ABSTRACT

Refrigeration management includes determining an optimal operational schedule to control a refrigeration system for a cold storage facility. Various approaches can be used to determine an operational schedule with an optimal operational outcome that satisfies constraints representative of a range of factors, such as thermal characteristics of a refrigeration management system, energy cost, and environmental factors external to the system, which can affect refrigeration management of a cold storage facility.

20 Claims, 14 Drawing Sheets

Related U.S. Application Data continuation of application No. 16/391,027, filed on Apr. 22, 2019, now Pat. No. 10,558,937.

(56) References Cited

U.S. PATENT DOCUMENTS

| | | |
|---|---|---|
| 7,474,080 B2 | 1/2009 | Huff et al. |
| 7,599,750 B2 | 10/2009 | Piche |
| 7,905,103 B2 | 3/2011 | Larsen et al. |
| 7,992,630 B2 | 8/2011 | Springer et al. |
| 8,352,148 B2 | 1/2013 | D'Amato et al. |
| 8,880,202 B2 | 11/2014 | Francino et al. |
| 10,534,328 B2 | 1/2020 | Ganti et al. |
| 10,558,937 B1 | 2/2020 | Wolf et al. |
| 11,367,028 B2 | 6/2022 | Wolf et al. |
| 2003/0177776 A1* | 9/2003 | Ghent ............. G06Q 10/06 236/46 R |
| 2005/0132734 A1 | 6/2005 | Narayanamurthy et al. |
| 2007/0125104 A1* | 6/2007 | Ehlers ............. G07F 9/105 62/157 |
| 2008/0000241 A1 | 1/2008 | Larsen et al. |
| 2008/0071892 A1 | 3/2008 | Muro et al. |
| 2013/0190940 A1 | 7/2013 | Sloop et al. |
| 2014/0041399 A1* | 2/2014 | Gan ............. F25B 49/02 62/161 |
| 2015/0124390 A1 | 5/2015 | Koch |
| 2015/0135737 A1* | 5/2015 | Cresswell ............. F25D 11/003 62/190 |
| 2016/0147204 A1* | 5/2016 | Wichmann ............. G05F 1/66 700/287 |
| 2016/0218505 A1 | 7/2016 | Krupadanam |
| 2017/0067661 A1* | 3/2017 | Barajas Gonzalez .... F24F 11/47 |
| 2017/0098181 A1 | 4/2017 | Herman et al. |
| 2019/0014488 A1* | 1/2019 | Tan ............. G06N 3/044 |
| 2020/0334600 A1 | 10/2020 | Wolf et al. |
| 2022/0283575 A1 | 9/2022 | Mehta et al. |
| 2022/0309422 A1 | 9/2022 | Wolf et al. |

OTHER PUBLICATIONS

International Preliminary Report on Patentability in International Appln. No. PCT/US2020/029405, dated Nov. 4, 2021, 8 pages.

PCT International Search Report and Written Opinion in International Application No. PCT/US2020/029405, dated Jun. 26, 2020, 13 pages.

* cited by examiner

SCHEDULED THERMAL CONTROL SYSTEM

CROSS-REFERENCE TO RELATED APPLICATIONS

This application is a continuation application of U.S. patent application Ser. No. 16/724,801, filed on Dec. 23, 2019, which claims priority under to U.S. patent application Ser. No. 16/391,027, filed on Apr. 22, 2019, the contents of all are hereby incorporated herein by reference.

TECHNICAL FIELD

This document generally relates to systems and techniques for refrigeration management.

BACKGROUND

Cold storage facilities, such as refrigerated warehouses, are used to store temperature-controlled items and maintain the items at a reduced temperature to prevent them from decaying. Examples of temperature-controlled items include perishables food (e.g., vegetables, fruits, meat, seafood, dairy products, etc.), flowers and plants, biopharmaceutical products, perishable nutrient products, and artwork. Cold storage facilities range across a wide array of sizes, from small walk-in coolers to large freezer warehouses. Several types of cold storages are available, such as refrigerated containers, blast freezers and chillers, cold rooms, pharmaceutical grade cold storage, plant-attached cold storage, and other cold storage facilities customized based on the nature of customers' products and their preferences.

The temperature within a cold storage facility is a result of a balance between heat removal from and heat intrusion into the facility. Heat intrusion within a cold storage can come from many different sources, and the rate of heat intrusion can vary due to various factors, such as time of day (e.g., day and night) and activities (e.g., opening a door of a cold storage). Heat removal from a cold storage facility can be performed by driving a refrigeration system connected to the facility. Thus, as heat intrusion changes, so does the need for power (e.g., electricity) to drive the refrigeration system for heat removal.

SUMMARY

This document generally describes systems and methods for refrigeration management. An optimal operational schedule is determined and used to control a refrigeration system for a cold storage facility. Some embodiments described herein use optimization approaches to determine an operational schedule with an optimal operational outcome that satisfies constraints representative of a range of factors associated with, and/or affecting refrigeration management of a cold storage facility. For example, a variety of factors, such as thermal characteristics of an overall refrigeration management system, energy cost, and environmental factors external to the system, can affect operation of a cold storage facility. Further, such factors can constantly vary over time. Given values of the factors for a period of time, a number of different operational schedules can be determined, each of which can possibly be used to control a cold storage facility. However, such different operational schedules can result in different operational efficiencies which, for example, can represent energy costs and/or energy consumptions in driving a refrigeration system for a particular cold storage facility.

To quickly adapt to such dynamic nature of the variety of factors that affect the operation of cold storage facilities, the optimization techniques disclosed herein can determine an optimal operational schedule from a large catalog of possible operational schedules in real time or within a very limited period of time. In some implementations, the determined operational schedule might not necessarily result in the best operational outcome (e.g., the most efficient solution) among the plurality of candidate operational schedules. Instead, some embodiments disclosed herein can provide solutions to determine an operational schedule that is reasonably efficient (e.g., reasonable energy cost saving and/or energy consumption saving) and provide such an operational schedule in a timely manner to satisfy constantly changing environments and aspects of a cold storage facility and a refrigeration system therefor.

In some examples, an operational schedule for controlling a refrigeration system can be determined based on at least one of a thermal model of an overall system, an energy cost model, and an environmental model. The thermal model of the overall system can represent one or more thermal properties of a subject cold storage facility and a refrigeration system associated with the facility. The energy cost model can include energy costs. The environmental model can represent a variety of external environmental conditions around the cold storage facility, such as external weather (e.g., temperature, humidity, precipitation, cloud cover, wind speed and direction, etc.).

The disclosed technologies can determine an optimal operational schedule sufficiently fast for an immediate goal, such as providing a satisfactory efficiency in running a cold storage facility (e.g., savings in energy costs and/or energy consumptions). In examples, the disclosed technologies evaluate the thermal model, the energy cost model, and the environmental model, and generate a plurality of candidate operational schedules that are potentially available for controlling a refrigeration system for a subject cold storage facility. An operational schedule for controlling a subject refrigeration system can be selected from the plurality of candidate operational schedules such that the selected operational schedule can result in an optimal efficiency that is reasonable or satisfactory, if not the best, in running the refrigeration system. Such an optimal efficiency can represent energy costs, energy consumption, or the combination thereof. In some examples, the optimal efficiency does not necessarily achieve the best result (e.g., the most energy cost saving and/or the lowest energy consumption) of controlling the refrigeration system, but provide the most reasonable result in a timely manner without using significant computing resources and time that would otherwise be required for the best outcome.

The optimization techniques disclosed herein can use convex optimization problem solvers, which permit fast calculation and optimality. The convex optimization techniques herein can provide an optimal operational schedule within specified constraints.

Particular embodiments described herein include a method for determining an operational schedule to control a refrigeration system for an enclosure. The method can include determining a thermal model of the enclosure and the refrigeration system, the thermal model modeling one or more thermal properties of the enclosure and the refrigeration system under varied use and environmental conditions; obtaining an energy cost model, the energy cost model including a schedule of projected energy costs for a predetermined period of future time; obtaining an environmental model, the environmental model including one or more projected external environmental conditions in a geographic area where the enclosure is located for the predetermined period of future time; determining the operational schedule to control the refrigeration system; and operating the refrigeration system to control the enclosure based on the determined operational schedule. The operational schedule can be determined by: generating a plurality of candidate schedules for controlling the refrigeration system for the predetermined period of future time, the plurality of candidate schedules determined based on the thermal model, the energy cost model, and the environmental model; generating a multi-dimensional graph providing costs for cooling the enclosure according to the plurality of candidate schedules; randomly selecting a seed schedule from the plurality of candidate schedules; evaluating the seed schedule in the multi-dimensional graph using an iterative optimization algorithm; and determining the operational schedule that provides an optimal cost, the optimal cost corresponding to a local minimum of the costs identified when starting with the seed schedule in the multi-dimensional graph.

In some implementations, the system can optionally include one or more of the following features. The operational schedule may be determined further by: evaluating the costs for cooling the enclosure according to the plurality of candidate schedules, based on the thermal model, the energy cost model, and the environmental model. Evaluating the seed schedule may include comparing a cost of the seed schedule to costs of a portion of the plurality of candidate schedules. The costs may represent efficiency of the plurality of candidate schedules in controlling the refrigeration system. The costs may represent an energy cost, an energy consumption, or a combination of the energy cost and the energy consumption. The operational schedule may be determined for one or more points in time over the predetermined period of future time. The method may further include calibrating the multi-dimensional graph over time. The iterative optimization algorithm may include gradient descent. The thermal properties may include at least one of a thermal capacity of content within the enclosure and a thermal resistance of the enclosure. The external environmental conditions may include at least one of temperature, humidity, precipitation, cloud cover, wind speed, and wind direction external to the enclosure. The plurality of candidate schedules may provide different levels of cooling of the enclosure at different points in time. The different levels of cooling may include different levels of electric power for operating the refrigeration system.

Particular embodiments described herein include a cold storage facility. The cold storage facility can include a cold storage enclosure defining a space for content, a refrigeration system configured to cool the enclosed space, a plurality of sensors configured to sense temperatures at locations within the enclosed space, and detect parameters of the refrigeration system, and a control system. The control system includes a data processing apparatus, and a memory device storing instructions that when executed by the data processing apparatus cause the control system to perform operations including: determining a thermal model of the enclosure and the refrigeration system, the thermal model modeling one or more thermal properties of the enclosure and the refrigeration system under varied use and environmental conditions; obtaining an energy cost model, the energy cost model including a schedule of projected energy costs for a predetermined period of future time; obtaining an environmental model, the environmental model including one or more projected external environmental conditions in a geographic area where the enclosure is located for the predetermined period of future time; determining the operational schedule to control the refrigeration system; and operating the refrigeration system to control the enclosure based on the determined operational schedule. The operational schedule can be determined by: generating a plurality of candidate schedules for controlling the refrigeration system for the predetermined period of future time, the plurality of candidate schedules determined based on using the thermal model, the energy cost model, and the environmental model; generating a multi-dimensional graph providing costs for cooling the enclosure according to the plurality of candidate schedules; randomly selecting a seed schedule from the plurality of candidate schedules; evaluating the seed schedule in the multi-dimensional graph using an iterative optimization algorithm; and determining the operational schedule that provides an optimal cost, the optimal cost corresponding to a local minimum of the costs identified when starting with the seed schedule in the multi-dimensional graph.

In some implementations, the system can optionally include one or more of the following features. Evaluating the seed schedule may include comparing a cost of the seed schedule to costs of a portion of the plurality of candidate schedules. The costs may represent efficiency of the plurality of candidate schedules in controlling the refrigeration system. The costs may represent an energy cost, an energy consumption, or a combination of the energy cost and the energy consumption. The operational schedule may be determined for one or more points in time over the predetermined period of future time. The iterative optimization algorithm may include gradient descent. The plurality of candidate schedules may provide different levels of cooling of the enclosure at different points in time, the different levels of cooling including different levels of electric power for operating the refrigeration system.

Particular embodiments described herein include a cold storage management computer system for controlling a refrigeration system for an enclosure. The cold storage management computer system can include a data processing apparatus, and a memory device storing instructions that when executed by data processing apparatus cause the user device to perform operations including: receiving, from a control system, a request for an operational schedule for the refrigeration system; determining a thermal model of the enclosure and the refrigeration system, the thermal model modeling one or more thermal properties of the enclosure and the refrigeration system under varied use and environmental conditions; obtaining an energy cost model, the energy cost model including a schedule of projected energy costs for a predetermined period of future time; obtaining an environmental model, the environmental model including one or more projected external environmental conditions in a geographic area where the enclosure is located for the predetermined period of future time; and determining the operational schedule to control the refrigeration system. The operational schedule can be determined by generating a plurality of candidate schedules for controlling the refrigeration system for the predetermined period of future time, the plurality of candidate schedules determined based on using the thermal model, the energy cost model, and the environmental model; generating a multi-dimensional graph providing costs for cooling the enclosure according to the plurality of candidate schedules; randomly selecting a seed schedule from the plurality of candidate schedules; evaluating the seed schedule in the multi-dimensional graph using an iterative optimization algorithm; and determining the operational schedule that provides an optimal cost, the optimal cost corresponding to a local minimum of the costs identified when starting with the seed schedule in the multi-dimensional graph.

Particular embodiments described herein include a cold storage control system for controlling cooling of a cold storage facility. The cold storage control system can include a data processing apparatus, a communication interface that transmits and receives data over one or more networks, one or more input ports configured to receive sensor signals from a plurality of sensors, one or more output ports configured to trigger operation of the refrigeration system configured to cool the cold storage facility, and a memory device storing instructions. The plurality of sensors may be configured to sense temperatures at locations within the cold storage facility, and detect parameters of a refrigeration system. The instructions are configured to, when executed by data processing apparatus, cause the cold storage control system to perform operations including: transmitting, over the one or more networks, a request for an operational schedule for the refrigeration system; receiving, in response to the request, the operational schedule; and controlling the refrigeration system according to the operational schedule. The operational schedule can be determined by generating a plurality of candidate schedules for controlling the refrigeration system for the predetermined period of future time, the plurality of candidate schedules determined based on using the thermal model, the energy cost model, and the environmental model; generating a multi-dimensional graph providing costs for cooling the enclosure according to the plurality of candidate schedules; randomly selecting a seed schedule from the plurality of candidate schedules; evaluating the seed schedule in the multi-dimensional graph using an iterative optimization algorithm; and determining the operational schedule that provides an optimal cost, the optimal cost corresponding to a local minimum of the costs identified when starting with the seed schedule in the multi-dimensional graph.

The disclosed systems and techniques may provide any of a variety of advantages. First, some embodiments described herein include techniques that use convex optimization problem solvers for determining operational schedules for controlling refrigeration systems for cold storage facilities. The approaches disclosed herein can determine operational schedules in a fast and cost-efficient way while providing a sufficiently optimal, or strictly optimal, solutions for management of cold storage facilities. For example, a variety of factors associated with managing cold storage facilities can be considered to provide a large number of different operational schedules that would result in different costs and efficiencies in running cold storage facilities. Further, the factors can constantly vary over time, thereby increasing the number of operational schedules that can possibly be selected to drive a refrigeration system for a particular cold storage facility. To satisfy constraints required by the variety of dynamic factors that affect the operation of cold storage facilities, the technologies disclosed herein enable determining an optimal operational schedule from a large (or infinite) catalog of possible operational schedules, although the determined operational schedule might not necessarily be the best one from the plurality of candidate operational schedules depending on specified constraints. The optimal operational schedule can be determined in real time or within a very limited period of time. The best operational schedule would require more time and resources, and thus would not be determined in a timely manner to respond to constantly changing environments and aspects of cold storage facilities and refrigeration systems therefor.

Second, some embodiments described herein include time-shifted cooling strategies which can introduce a variety of efficiencies. Such efficient cooling strategies can be particularly relevant in the context of cooled or refrigerated facilities, which have traditionally consumed large amounts of energy. For example, facilities can reduce and/or eliminate instances of a cooling system (and/or some of its subcomponents) being toggled on and off, which can introduce inefficiencies as the system ramps up and down. With some conventional facilities, cooling systems may be run intermittently throughout the day, which can be inefficient. Instead of intermittently running such systems, those systems can be run in one (or more) longer and consecutive stretches to bring the facility temperature down to a lower temperature (below a setpoint), and can then be turned off or controlled to reduce power usage. Accordingly, inefficiencies around cooling systems being turned on and off intermittently can be reduced and/or eliminated.

Third, operational energy costs for refrigeration systems can be reduced. For example, the technology herein determines an optimal operational schedule having a minimum-cost control profile. In addition, the technology may be used with a power demand shift strategy (e.g., the ability to time-shift the use of energy) so that energy consumption during peak demand can be reduced and/or eliminated, and instead shifted to non-peak periods of time. This can reduce the operational energy cost of cooling a facility because energy during peak periods of time is generally more expensive than non-peak time.

The details of one or more implementations are set forth in the accompanying drawings and the description below. Other features and advantages will be apparent from the description and drawings, and from the claims.

DETAILED DESCRIPTION OF ILLUSTRATIVE EMBODIMENTS

Figure 1:
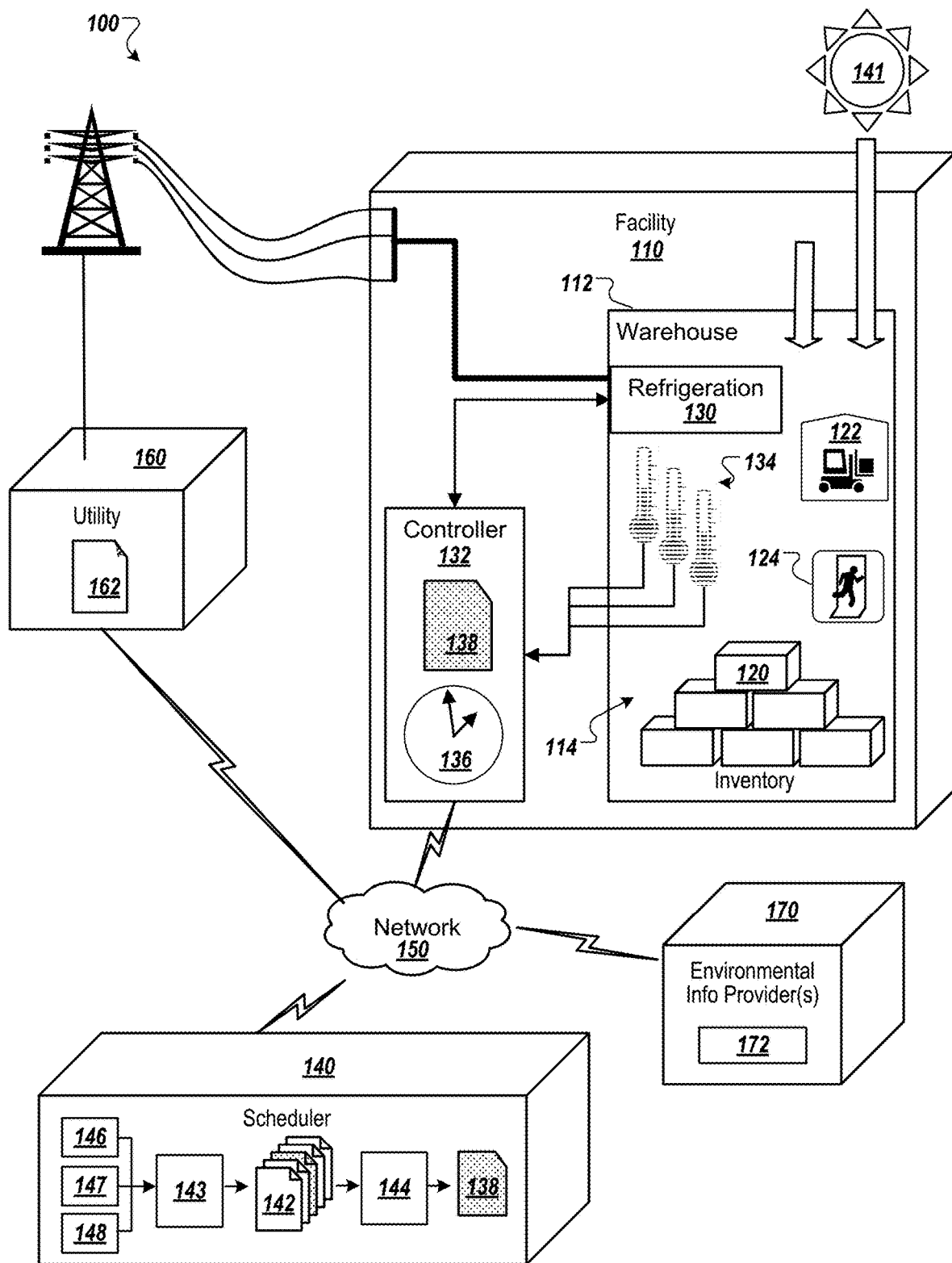
FIG. 1 is a schematic diagram that shows an example refrigeration management system.

This document describes systems and methods for refrigeration management, more specifically for driving a refrigeration system for a cold storage facility in an optimal manner (e.g., optimal reduction of energy cost and/or energy consumption) quickly enough to respond to a variety of factors that constantly change and affect operations of the refrigeration system and the cold storage facility.

A wide range of factors are considered in determining an operational schedule for controlling a refrigeration system for a cold storage facility. The factors can be represented by one or more models, such as a thermal model of an overall system, an energy cost model, and an environmental model. The thermal model of the overall system can represent one or more thermal properties of a subject cold storage facility and a refrigeration system associated with the facility. The energy cost model can include energy costs. The environmental model can represent a variety of external environmental conditions around the cold storage facility, such as external weather (e.g., temperature, humidity, precipitation, cloud cover, wind speed and direction, etc.).

The disclosed technologies can determine an optimal operational schedule in a timely manner based on evaluation of at least one of the thermal model, the energy cost model, and the environmental model. The determined operational schedule may be configured to provide an overall cost-efficient solution for controlling a refrigeration system for a cold storage facility. In some examples, an optimal operational schedule provides a cost-efficient solution that reasonably optimize an energy cost, an energy consumption, or a combination thereof in operating a cold storage facility with a refrigeration system.

Further, the operational schedule determined by the technologies disclosed herein consider the fact that the amount of power needed to remove heat from a cold storage facility can vary on a daily cycle due to various factors, such as the sun's heat, outdoor temperatures, work shifts, etc. The demand on a utility provider generally also varies on a daily cycle as well, and some utility providers use "peak pricing" and/or variable pricing in which the cost of power goes up during times of high demand (e.g., summer mid-day), and goes down for times of low demand (e.g., night).

In the realm of electrically powered facilities, batteries or flywheels can be charged during off-peak periods to take advantage of lower, off-peak energy pricing, and discharged to power loads during on-peak periods to avoid consuming power at relatively higher, on-peak rates. Somewhat analogously, this document describes processes in which cold storage facilities are used as forms of thermal energy storage units that can be "charged" (e.g., over-chilled) during low-price energy periods and "discharged" (e.g., allowed to relax from the over-chilled state) during high-price energy periods reduce or avoid the need for power consumption during high-price periods while still keeping stored inventory at or below a predetermined temperature during the high-price periods.

In general, the cold storage facility can be pre-charged to a below-normal cooled temperature using cheaper power and/or when the facility is inherently more efficient to operate (e.g., cool hours, nighttime), and then be allowed to rise back closer to normal cooled temperatures to reduce or avoid having to draw more expensive power and/or operate during periods in which the facility is inherently less efficient to operate (e.g., peak temperature hours, daytime). For example, a freezer warehouse may normally be kept at 0° F., but in anticipation of an upcoming peak-pricing period (e.g., mid-day tomorrow during the warm season) the warehouse can be pre-cooled to −5° F. during nighttime pricing. When the peak-pricing time arrives, at least a portion of the power demand and/or cost can be reduced by allowing the warehouse to warm back toward 0° F. rather than by powering the refrigeration system using peak-priced power.

FIG. 1 is a schematic diagram that shows an example refrigeration management system 100. A refrigeration facility 110 (e.g., cold storage facility) includes a warehouse 112. The warehouse 112 can be an insulated cold storage enclosure that defines a substantially enclosed space 114. The enclosed space 114 has various content, including an inventory 120, a collection of equipment 122 (e.g., forklifts, storage racks), and air. The inventory 120, the equipment 122, and the air within the enclosed space 114 has a thermal mass, as does the material of the warehouse 112 itself (e.g., steel supports, aluminum walls, concrete floors)

The enclosed space 114 is cooled by a refrigeration system 130 that is controlled by a controller 132 based on temperature feedback signals from a collection of sensors 134 (e.g., temperature, humidity, airflow, motion). In some embodiments, the controller 132 can be a cold storage control system controller, and can include a processor, memory, storage, inputs, and outputs. The sensors 134 are distributed throughout the warehouse 112 to enable the controller 132 to monitor environmental conditions throughout the enclosed space 114, and in some embodiments, in and/or near the inventory 120 (e.g., sensors embedded in or between boxes or pallets of stored goods). The controller 132 is configured to activate the refrigeration system 130 based on feedback from the sensors 134 to keep the enclosed space 114 at a temperature below a predetermined temperature limit. For example, an operator of the refrigeration facility 110 can agree to store a customer's frozen foods (e.g., frozen meats, frozen French fries, ice cream) below a maximum of 0° F.

The temperature within the enclosed space 114 is affected by heat intrusion into the refrigeration facility 110. Heat intrusion within a cold storage facility can come from many different sources, such as the environment (e.g., ambient air temperature, solar radiation), the stored content (e.g., warm product to be chilled), heat-producing equipment operating inside the facility (e.g., lights, forklifts), body heat from people working inside the facility, and facility operations (e.g., opening of doors as people and inventory pass into and out of the facility).

The rate of heat intrusion can vary over time. Heat intrusion generally increases during the day as outdoor summer temperatures rise and as the sun rises to its peak midday intensity, and generally decreases as outdoor summer temperatures and solar intensity fall. Heat intrusion can also increase during times of high activity, such as during the workday when doors are opened frequently, and decrease during times of low activity such as during after-hours when doors generally remain shut.

The warehouse 112 can be configured to resist heat infiltration. Heat energy that can raise the temperature of the enclosed space 114 and its contents can come from a number of sources. One example source of heat energy is the sun 141, which can directly warm the structure of the warehouse 112 and warms the ambient environment surrounding the warehouse 112 and the refrigeration facility 110. Such heat energy can infiltrate the warehouse 112 directly through the walls of the warehouse 112 and/or through the opening of a door 124.

Other sources of heat energy can come from the operation of the equipment 122 (e.g., warm engines of forklifts, heat given off by lighting), the body heat of humans working within the enclosed space 114, and the inventory 120 itself (e.g., fresh product may arrive at 20° F. for storage in a 0° F. freezer).

The controller 132 is in data communication with a scheduler 140 by a network 150 (e.g., the Internet, a cellular data network, a private network). In some embodiments, the scheduler 140 can be a cold storage management server computer in communication with the controller 132. In some phases of operation, the controller 132 collects measurements from the sensors 134 and time stamps based on a chronometer 136 (e.g., clock, timer) and provides that information to the scheduler 140. The scheduler 140 uses such information to determine a thermal model of the warehouse 112. An example process for the determination of thermal models will be discussed further in the description of FIG. 8.

In previous designs, temperature controllers generally monitor a temperature within a freezer to turn refrigeration systems on when internal temperatures exceed a preset temperature, and turn the systems off when the internal temperatures drop to slightly below the preset temperature. This range represents the hysteresis range for the controller under nominal operational conditions. Such operational behavior is discussed further in the description of FIG. 3.

In the example of the system 100, the controller 132 receives an operational schedule 138 from the scheduler 140. As described herein, the operational schedule 138 is selected from a plurality of candidate schedules 142 and can provide an optimal schedule for controlling the refrigeration system 130 for the warehouse 112. In this document, therefore, the selected operational schedule 138 can be referred to as an optimal schedule, an optimal operational schedule, or the like. The optimal schedule 138 provides an optimal operational outcome that satisfies constraints representative of factors which are associated with, and/or affect, control of the refrigeration system 130 for the warehouse 112. For example, the optimal schedule 138 can provide efficiency that optimizes energy costs, energy consumptions, or the combination of the energy costs and the energy consumptions in operating the refrigeration system 130 for the warehouse 112.

In some implementations, the optimal schedule 138 can include information that causes the controller 132 to precool the enclosed space 114 to a temperature below the predetermined temperature limit for the inventory 120, and in some examples, below a hysteresis range for normal operation of the refrigeration system 130, during one or more predetermined periods of time. For example, under nominal operational conditions the controller 132 may be configured to keep the enclosed space below 0° F. by turning the refrigeration system 130 on when a temperature within the warehouse 112 exceeds −1° F., and turns the refrigeration system 130 off when the temperature drops below −2° F. However, the optimal schedule 138 may configure the controller to cool the enclosed space toward −5° F. or some other predetermined temperature during one or more pre-defined periods of time. As will be described in more detail below, such periods of time can proceed periods of time in which the price of power is relatively higher (e.g., peak pricing periods, periods of inherently low system efficiency).

In the illustrated example, the scheduler 140 includes a candidate schedule determination module 143 and an optimal schedule determination module 144. The candidate schedule determination module 143 is configured to determine one or more operational schedules 142 based on a variety of factors. The optimal schedule determination module 144 is configured to determine an optimal schedule 138 among the operational schedules 142.

The scheduler 140 can be configured to determine one or more operational schedules 142, at least some of which can be candidates for an optimal schedule 138. The scheduler 140 can determine operational schedules 142 based on a variety of factors. For example, the scheduler 140 can determine operational schedules 142 based on at least one of a thermal model 146, an energy cost model 147, and an environmental model 148. The models can represent a variety of factors which can affect the operation of the refrigeration facility 110 including the control of the refrigeration system 130 and/or the management of the warehouse 112.

For example, the scheduler 140 can receive thermal model information about the refrigeration facility 110, such as timed readings from the sensors 134 and operational information about the refrigeration system 130, to determine a thermal model 146 of the refrigeration facility 110. Example determination of a thermal model 146 is discussed in more detail herein, for example with reference to FIGS. 5 and 8.

In addition or alternatively, the scheduler 140 can receive an energy cost schedule 162 from, for example, a utility provider 160 that provides power to the refrigeration facility 110, to determine an energy cost model 147 of the refrigeration system 110. The energy cost schedule 162 includes information about the cost of energy at different times and/or different days. The cost of energy can include one or more types of usage rates, such as fixed rates, step rates, time-of-use rates, demand rates, etc. For example, the utility provider 160 can be an electric power provider that normally charges $0.12 per kilowatt-hour (kWh), but increases the cost to $0.20 per kilowatt-hour consumed between 10 am-2 pm because demand for electrical power may peak during that time. In another example, the utility provider 160 may charge more during the summer months than during the winter months due to the seasonal demand caused by air conditioners and other cooling systems such as the refrigeration system 130. In general, the energy cost schedule 162 describes one or more future cycles (e.g., daily) where power costs are scheduled to go up and down.

In addition or alternatively, the scheduler 140 can receive environmental information 172 associated with the refrigeration facility 110 from, for example, one or more environmental information providers 170, to determine an environmental model 148 of the refrigeration facility 110. Environmental information 172 can include a variety of environmental conditions of the refrigeration facility 110 including the warehouse 112 and the refrigeration system 130. The environmental information providers 170 can communicate with the refrigeration facility 110, the scheduler 140, and/or the utility provider 160 over the network 150.

Figure 11:
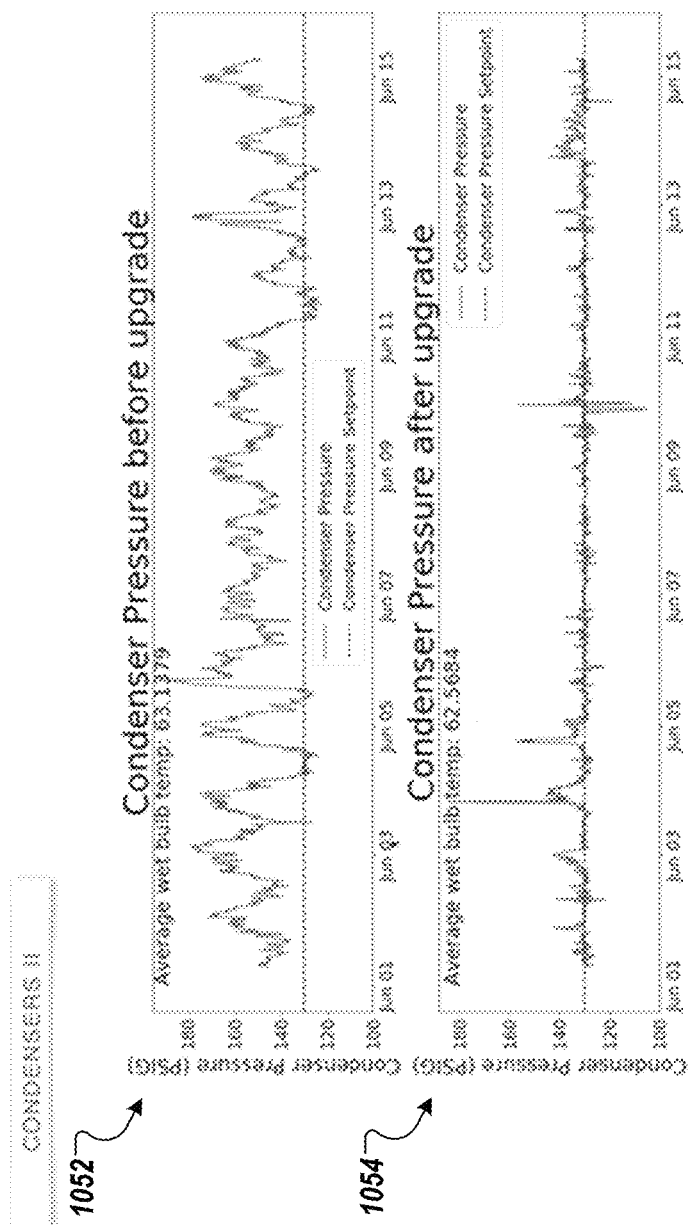
FIG. 11 is a chart depicting example changes to a compressor before and after upgrades.

Environmental conditions of the refrigeration facility 110 can affect the operation of the refrigeration facility 110. Several environment conditions, such as temperature, humidity, precipitation, cloud cover, wind speed and direction, etc., can impact operational conditions of one or more components in the refrigeration system 130, such as a condenser, a compressor, an expansion valve, an evaporator, an accumulator, and a fan assembly which are included in the refrigeration system 130. For example, ambient temperature external to the refrigeration system can affect the operation of a condenser such that the condenser pressure varies significantly over time. Such an unstable condenser pressure is illustrated in a chart 1052 in FIG. 11. The technologies described herein consider such varying environmental conditions and reflect them in determining an optimal operational schedule. The refrigeration system 130 that is controlled using the optimal operational schedule determined according to the technologies described herein enables its components to operate in their optimal, efficient manners. For example, the optimal operational schedule allows the condenser to operate with significantly stabilized condenser pressure, as illustrated in a chart 1054 in FIG. 11.

By way of example, the information provider 170 can be a metrological service information server computer that provides daily or hourly weather forecasts. In such an example, the utility provider 160 may use a forecast of hot weather to predict increased demand and attempt to incentivize reduced demand by increasing the cost of power during hot hours, and/or the scheduler 140 may use the forecast to determine operational schedules 142 that pre-chill the warehouse 112 in anticipation of hot weather than increased heat influx. In another example, the utility provider 160 may provide signals for demand response events, and/or the scheduler 140 may use the signals to generate and/or modify operational schedules 142.

In addition or alternatively, the information provider 170 can be a solar or wind energy provider, and can provide a forecast of surplus solar or wind energy (e.g., a particularly sunny or windy day) that would be available to pre-chill the warehouse 112.

In addition or alternatively, the information provider 170 can be a production or logistics scheduler. For example, the information provider 170 may provide information to the scheduler 140 that indicates that a high level of activity may be planned for the warehouse 112 between 4 pm and 5 pm tomorrow. Since high levels of activity may include increased output of heat by the equipment 122 and workers, and more frequent or prolonged openings of the door 124 that might alter the thermal model of the warehouse 112. The scheduler 140 may respond by pre-chilling the enclosed space in anticipation of this predicted activity and the predicted influx of heat In addition or alternatively, the information provider 170 may provide information to the scheduler 140 about the inventory 120. Different types of inventory can have different thermal characteristics. For example, a pallet of ice cream in plastic pails may absorb and release heat energy in different amounts and at different rates than a pallet of cases of onion rings packaged in plastic bags within corrugated cardboard boxes. In some embodiments, the scheduler 140 can use information about the thermal properties the inventory 120 or changes in the inventory 120 to modify the thermal model and modify the operational schedules 142 to account for changes to the thermal model. For example, the scheduler 140 prescribe a longer precooling period than usual when the inventory 120 includes items having unusually high thermal capacities and/or items that are stored in well-insulated containers.

Different types of inventory can also enter the warehouse 112 in different states. For example, the information provider 170 may provide information to the scheduler 140 that indicates that a large inventory of seafood at 10° F. is due to arrive at a 5° F. warehouse at 9 am tomorrow. The scheduler 140 may modify the operational schedules 142 to offset the effect cooling the seafood from the incoming 10° F. to the warehouse's setpoint of 5° F. while also anticipating and offsetting the effects of variable energy pricing by prescribing a longer and/or colder period of pre-cooling.

Figure 2:
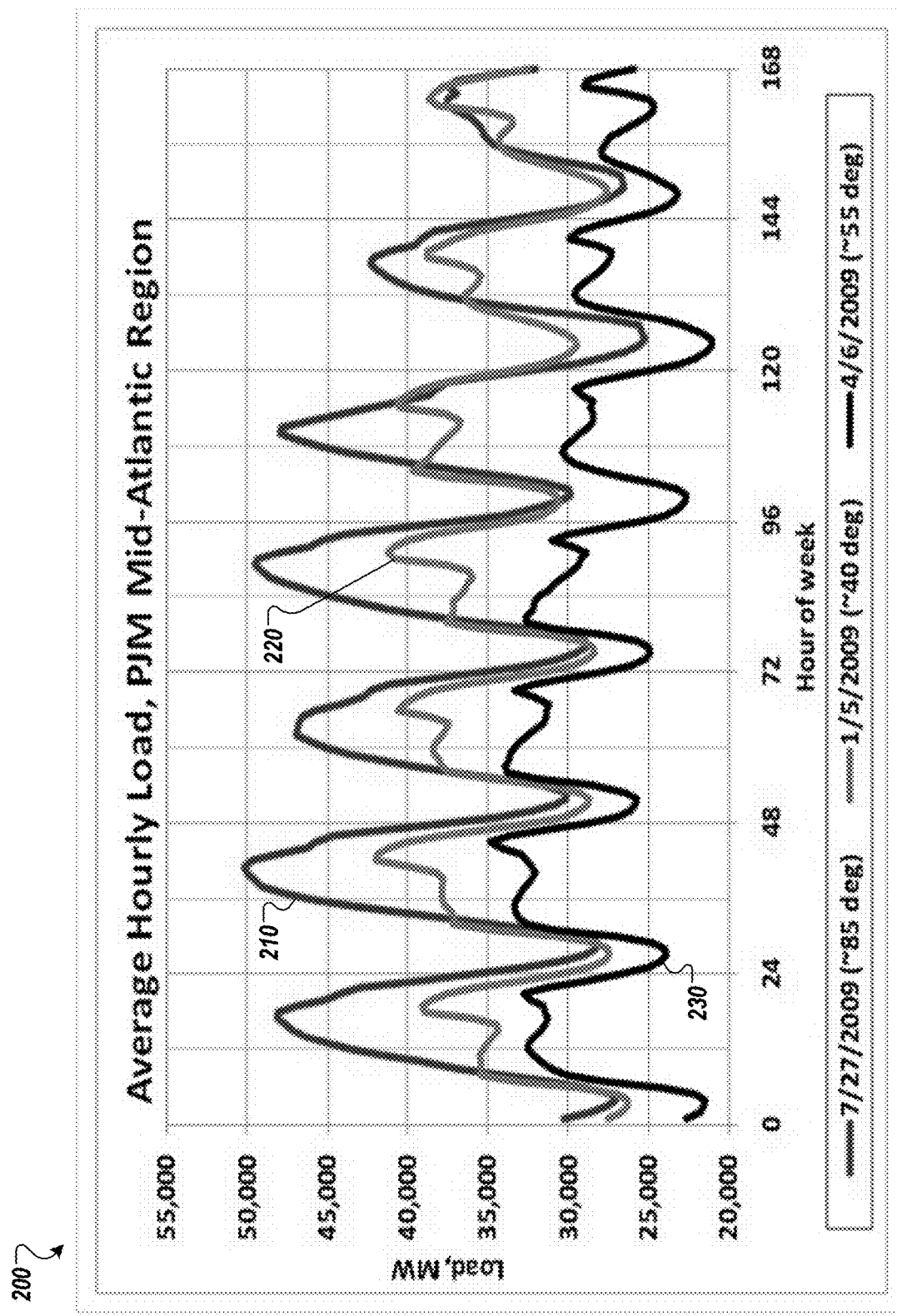
FIG. 2 is a graph of three example hourly power loads on a utility provider, such as the example utility provider.

FIG. 2 is a graph 200 of three example hourly power loads on a utility provider, such as the example utility provider 160 of FIG. 1. A demand curve 210 shows an example of average hourly power load for the Mid-Atlantic region of the United States for the week of Jul. 7, 2009, when the average temperature was 85° F. A demand curve 220 shows an example of average hourly power load for the Mid-Atlantic region of the United States for the week of Jan. 5, 2009, when the average temperature was 40° F. A demand curve 230 shows an example of average hourly power load for the Mid-Atlantic region of the United States for the week of Apr. 6, 2009, when the average temperature was 55° F.

Each of the demand curves 210-230 shows that average hourly power loads varies on a substantially daily cycle, peaking around noon each day, and reaching a low point just after midnight each day. In the illustrated example, each of the demand curves 210-230 starts on a Monday, and shows that average hourly power loads varies on a substantially weekly cycle. For example, the demand curve 210 shows higher peak demands for the first five cycles of the week (e.g., the work week, peaking around 47,000 MW around noon on Monday through Friday) and is on average lower for the sixth cycle of the week (e.g., peaking around 43,000 MW around noon on Saturday) and even lower for the seventh cycle (e.g., peaking around 38,000 MW Sunday, when even fewer businesses are open and consuming power).

Power utilities generally build out their infrastructure in order to provide enough power to avoid brownouts and outages under as many circumstanced as practical. That generally means having enough power generating capacity to accommodate expected peak loads. However, during off-peak times the utility may have excess power generation capacity that is going unused while still incurring overhead costs. As such, utility providers may be incentivized to minimize excess power production capacity and maximize unused production capacity. One way that utility providers can do this is by incentivizing power consumers to reduce their demand for power during peak times and possibly shift that demand to off-peak times. Customers can be incentivized by varying the cost of power consumption such that the price for power during peak times is relatively higher, and the price during off-peak times is relatively lower.

Figure 3:
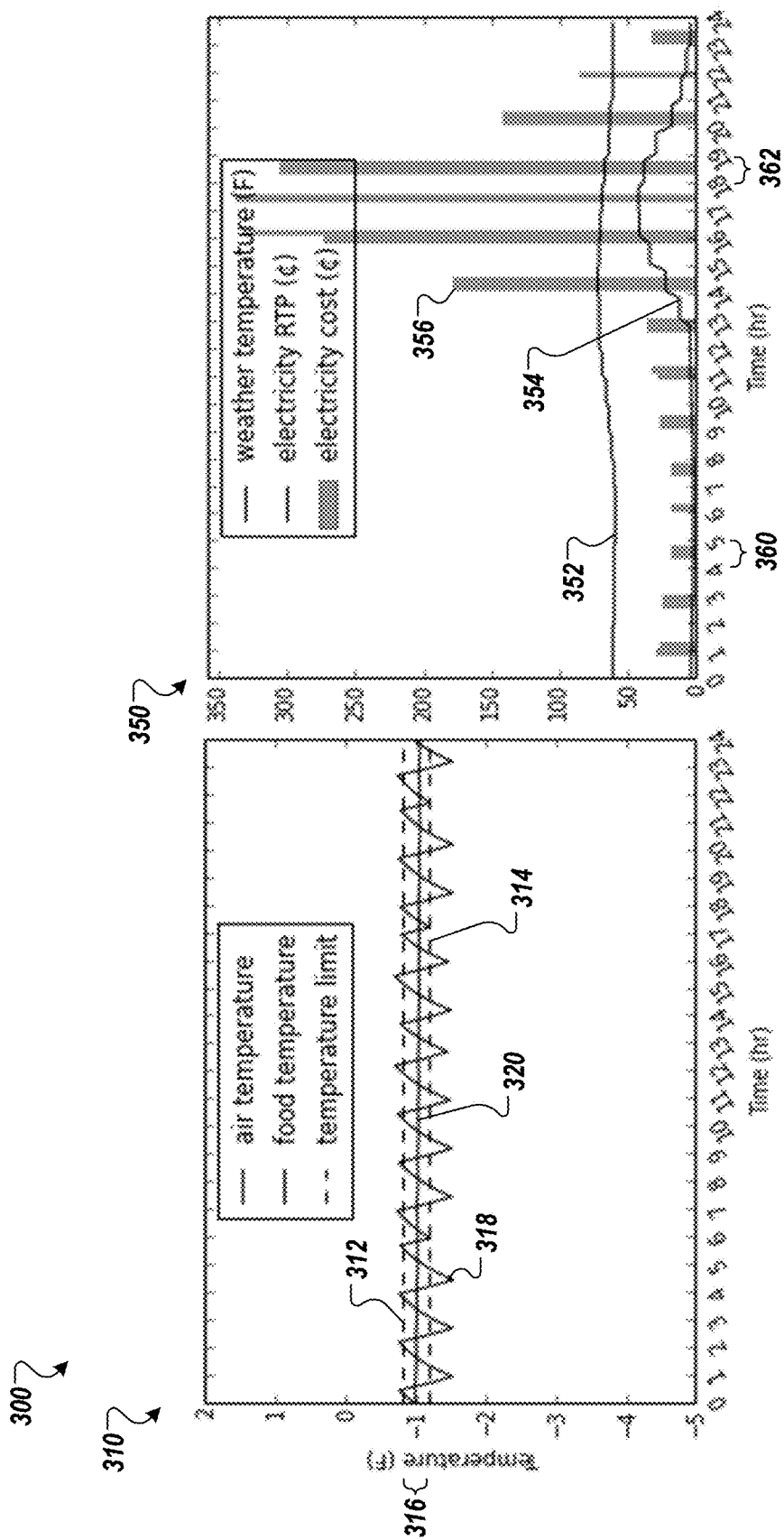
FIG. 3 is a graph of example temperature, example power use, and example power costs without precooling.

FIG. 3 is a graph 300 of example temperature, example power use, and example power costs without precooling. In some implementations, the graph 300 can be an example of the behavior of a refrigeration facility that is not configured to use operational schedules such as the example operational schedules 138, 142 of FIG. 1. The graph 300 includes a subgraph 310 and a subgraph 350.

The subgraph 310 is a chart of an example temperature curve over an example 24-hour period. In general, refrigeration systems do not run 100% of the time, and unmanaged refrigeration systems cycle on and off based on thermostatic control. The subgraph 310 shows an example upper temperature limit 312 that is set slightly above −1° F., and a lower temperature limit 314 set slightly below −1° F. The upper temperature limit 312 and the lower temperature limit 314 define an example hysteresis for a thermostatic controller for a cold storage unit, such as the controller 132 of the example refrigeration management system 100. An air temperature curve 318 cycles approximately between the upper temperature limit 312 and the lower temperature limit 314 and the thermostatic controller turns a refrigeration system on when the upper temperature limit 312 is exceeded, and turns the refrigeration system off when the lower temperature limit 314 is reached. The air temperature curve 318 cycles around −1° F., and maintains an inventory (e.g., frozen food) temperature setpoint 320 substantially close to −1° F. In some embodiments, the inventory can have a greater thermal mass than air, and therefore the inventory temperature can exhibit a dampened thermal response compared to the air that can provide an averaging effect relative to the oscillations of the surrounding air temperature 318.

The subgraph 350 compares three other sets of data over the same 24-hour period as the subgraph 310. A weather temperature curve 352 shows an example of how the temperature of ambient (e.g., outdoor) temperatures vary during the example 24 hour period. A real-time price curve 354 shows an example of how a power utility can vary the price of power (e.g., electricity) over the 24-hour period. As can be seen from the curves 352 and 354, as the weather temperature 352 rises the real-time price 354 rises, albeit lagging slightly. In some examples, as the weather temperature 352 rises, power demand can rise with a delay (e.g., possibly because outdoor temperatures could rise more quickly than building interiors, thereby causing a delay before air conditioning systems and refrigeration systems would be thermostatically triggered), and such increased power demand may be disincentivized by the power provider by raising the cost of power during such peak times.

The subgraph 350 also shows a collection of power cost curves 356. The areas underneath the power cost curves 356 represents the amount of money consumed (e.g., cost) as part of consuming power, based on the real time price 354, during various periods of time within the 24 hour period. For example, the areas under the power cost curves 356 can be summed to determine a total cost of the power consumed during the example 24-hour period.

The power cost curves 356 correspond time wise with the drops in the air temperature curve 318. For example, when the refrigeration system 130 is turned on, power is consumed as part of causing the air temperature within the warehouse 112 to drop. In the illustrated example, the air temperature curve 318 and the power cost curves 356 show a periodicity, with periods of power consumption lasting about 25 minutes approximately every two hours. However, even though the duration of the power consumption cycles shown by the power consumption curves 356 are roughly equal in length, they vary greatly in height. For example, a cycle 360 has significantly less volume and therefore less total cost relative to a cycle 362. The difference in the costs between the cycles 360 and 362 is substantially based on the difference in the real time price 354 at the time of the cycle 360 and the relatively higher real time price 354 at the time of the cycle 362.

As described earlier, the graph 300 shows an example of the behavior of a refrigeration facility that is not configured to use operational schedules such as the example operational schedules 138, 142 of FIG. 1. For example, the graph 300 shows that power consumption occurs with a substantially regular frequency regardless of the real time price 354

Figure 4A:
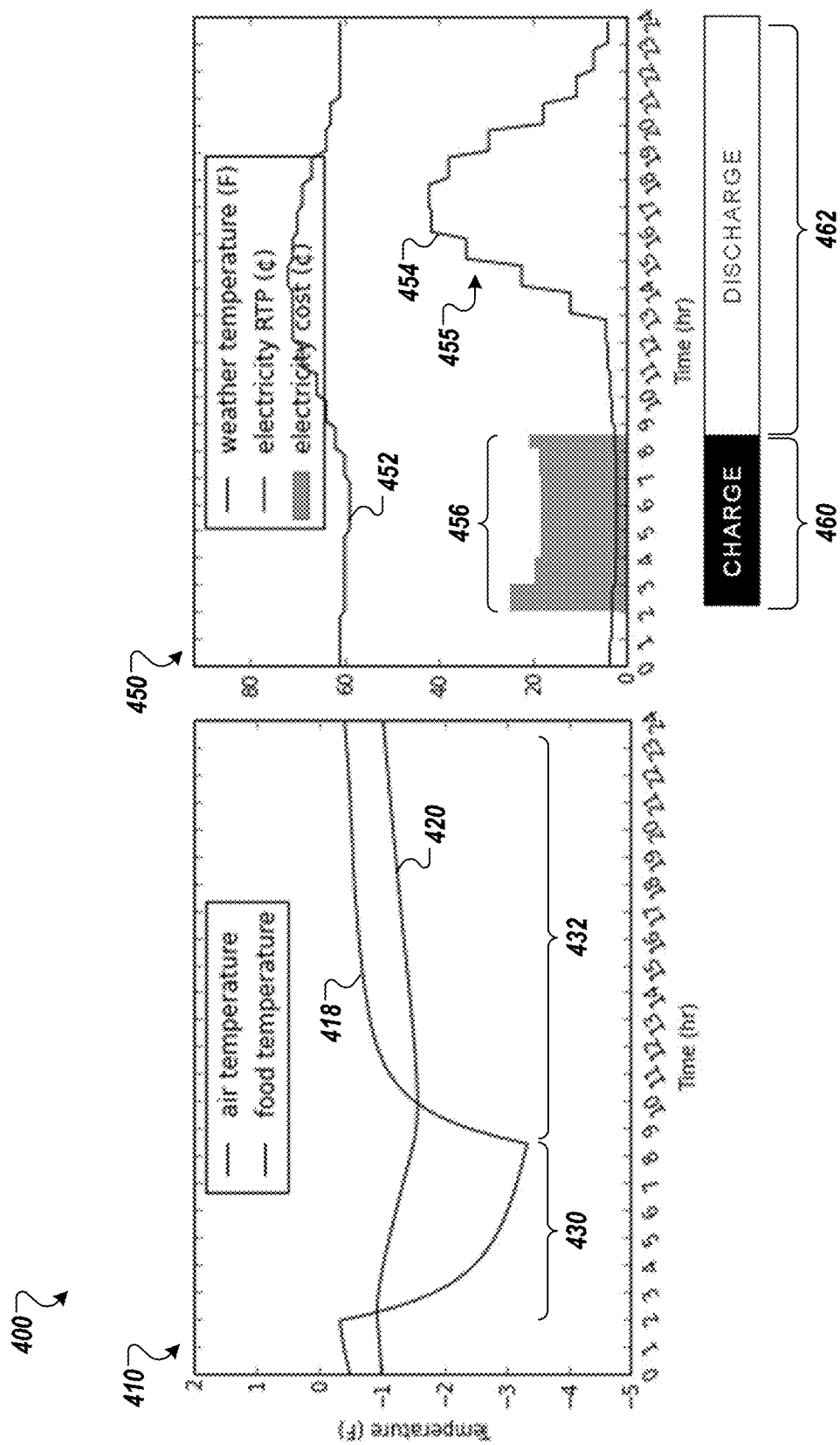
FIG. 4A is a graph of example temperature, example power use, and example power costs in an example in which precooling is used.

FIG. 4A is a graph 400 of example temperature, example power use, and example power costs in an example in which precooling is used. Typical refrigeration systems do not run 100% of the time, and unmanaged refrigeration systems cycle on and off based on thermostatic control. However, refrigeration systems according to the techniques disclosed herein, such as the example refrigeration management system 100 of FIG. 1, can use predetermined schedules in order to shift their "on" times and "off" times to predetermined times of the day in a way that optimize the operation of a refrigeration facility, such as the refrigeration facility 110. As described herein, such optimization includes optimization of costs to improve overall efficiency in operating the refrigeration facility. The costs to be optimized include an energy cost, an energy consumption, or a combination of the energy cost and the energy consumption. In some implementations, the graph 400 can be an example of the behavior of a refrigeration facility that is configured to use operational schedules, such as the example operational schedules 138, 142 of FIG. 1, which are configured to implement time-shifted cooling strategies. The graph 400 includes a subgraph 410 and a subgraph 450.

The subgraph 410 is a chart of several temperature curves over an example 24-hour period. An air temperature curve 418 varies as a thermostatic controller turns a refrigeration system on and off. The air temperature curve 418 cycles around −1° F., and maintains an inventory (e.g., frozen food) temperature curve 420 substantially close to −1° F. In some embodiments, the inventory can have a greater thermal mass than air, and therefore the inventory temperature 420 can exhibit a dampened thermal response compared to the air that can provide an averaging effect relative to the oscillations of the surrounding air temperature 418.

The air temperature curve 418 includes a large drop 430 starting around 2 am and ending around 8 am. The air temperature curve 418 also includes a large rise 432 starting around 8 am and continuing for the rest of the day. The inventory temperature 420 varies as well, but to a far lesser degree (e.g., due to the relatively greater thermal capacity of solid matter compared to air), varying by only a couple of tenths of a degree around −1° F.

The subgraph 450 compares three other sets of data over the same 24-hour period as the subgraph 410. A weather temperature curve 452 shows an example of how the temperature of ambient (e.g., outdoor) temperatures vary during the example 24 hour period. A real-time price curve 454 shows an example of how a power utility can vary the price of power (e.g., electricity) over the 24-hour period. As can be seen from the curves 452 and 454, as the weather temperature 452 rises the real-time price 454 rises, albeit lagging slightly. In some examples, as the weather temperature 452 rises, power demand can rise with a delay (e.g., possibly because outdoor temperatures could rise more quickly than building interiors, thereby causing a delay before air conditioning systems and refrigeration systems would be thermostatically triggered), and such increased power demand may be disincentivized by the power provider by raising the cost of power during such peak times.

The subgraph 450 also shows a power cost curve 456. The area underneath the power cost curve 456 represents the amount of money consumed (e.g., energy rate by energy consumed) as part of consuming power, based on the real time price 454, during various periods of time within the 24 hour period. The area under the power cost curve 456 can be summed to determine a total cost of the power consumed during the example 24-hour period.

The power cost curve 456 corresponds time wise with the drop 430 in the air temperature curve 418. For example, when the refrigeration system 130 is turned on, power is consumed as part of causing the air temperature within the warehouse 112 to drop. Unlike the example graph 300 of FIG. 3, which shows power consumption that occurs with a substantially regular frequency regardless of the real time price 354, the graph 400 shows that the power cost curve 456 is offset in advance of a peak 455 in the real time price curve 454.

In the illustrated example, the power cost curve 456 occurs in advance of the peak 455 due to an operational schedule, such as the example operational schedule 138, provided by a scheduler such as the example scheduler 140 and executed by a controller such as the example controller 132 to precool an enclosed space and inventory such as the example enclosed space 114 and the example inventory 120. In the illustrated example, an enclosed space is cooled and power is consumed during a charging period 460 that proceeds a discharge period 462.

During the charging period 460, the air temperature 418 is cooled below a nominal target temperature. For example, there may be a requirement that the inventory temperature 420 not be allowed to rise able 0° F., and therefore the corresponding refrigeration system may be configured to thermostatically control the air temperature 418 to normally cycle around −1° F., with a hysteresis of about +/−0.2° F. However, during the charging period 460, the refrigeration system may be configured to cool the air temperature 418 toward approximately −3.5° F.

The charging period 460 occurs in advance of the peak 455 in the real time price 454. As such, power consumption happens when power is relatively less expensive (e.g., the height of the power cost curve 456 is comparatively lower than the example power cost curve 356). During the discharge period 462, the air temperature 418 is allowed to relax back toward the −1° F. threshold, rather than consume power that is more expensive during the peak 455 of the power cost curve 454. By scheduling the charge period 460 (e.g., extra precooling during low-cost power times) and the discharge period 462 (e.g., allowing temperatures to partly relax during high-cost power times), the total energy cost associated with the power cost curve 456 can be less than the total energy cost associated with unscheduled operations such as those represented by the sum of the power cost curves 356.

Figure 4B:
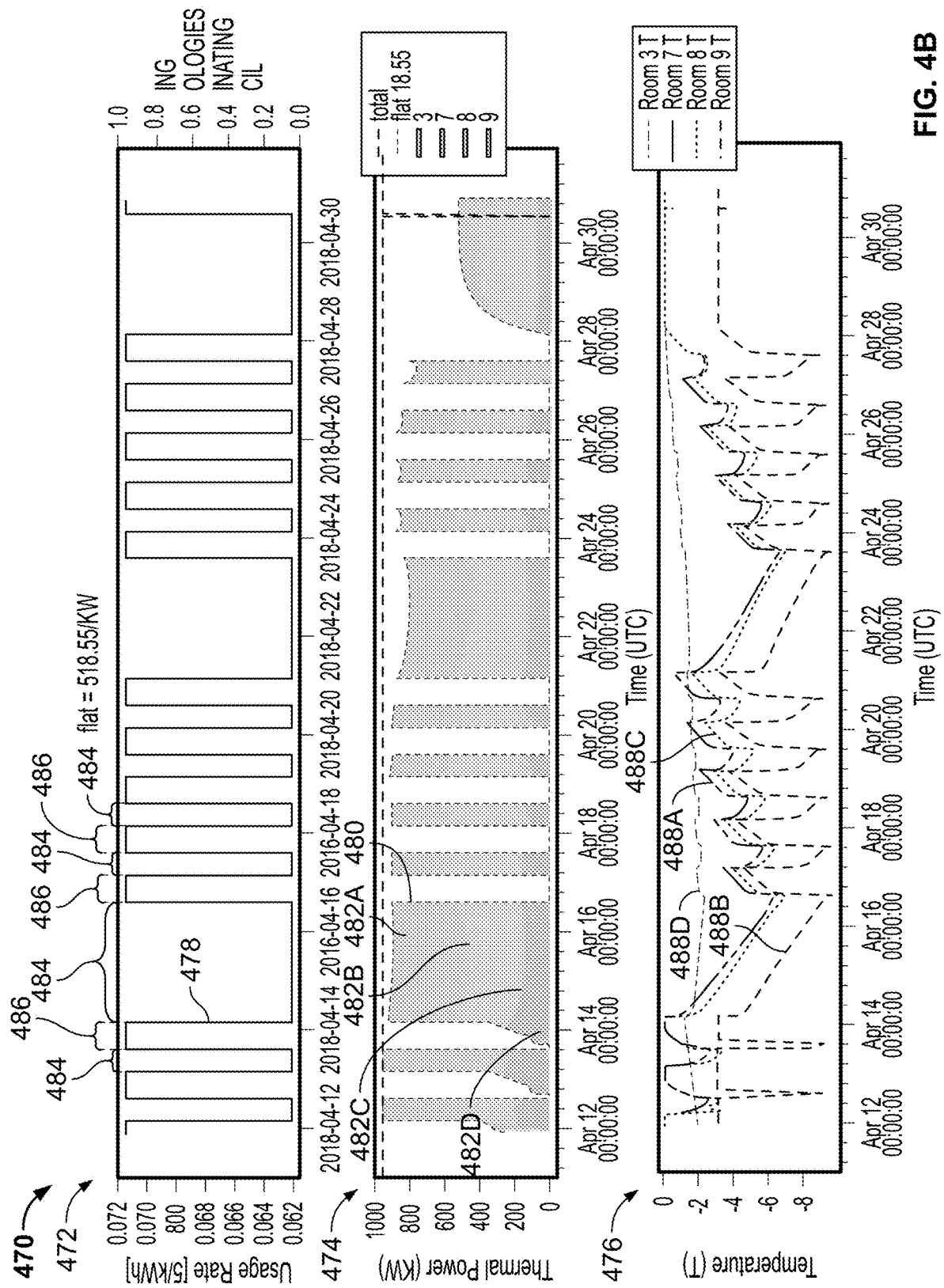
FIG. 4B is a graph of example usage rate, example thermal power, and example temperatures for a refrigeration facility having multiple storage rooms.

FIG. 4B is a graph 470 of example usage rate, example thermal power, and example temperatures for a refrigeration facility having multiple storage rooms. In some implementations, the graph 470 can be an example of the behavior of a refrigeration facility that is configured to use operational schedules, such as the example operational schedules 138, 142 of FIG. 1, which are configured to implement time-shifted cooling strategies. The graph 470 includes subgraphs 472, 474, and 476.

The subgraph 472 is a chart of a usage rate curve 478 over a few example days. Similarly to the real-time price curve 454 in FIG. 4A, the usage rate curve 478 shows an example of how a power utility can vary the rate of electricity over time. For example, the usage rate can change over a 24-hour period of each day, over each week, etc. The illustrated example of the usage rate curve 478 shows a pattern of a usage rate that remains low over a few days including a weekend (e.g., Apr. 14-16, 21-23, and 28-30, 2018).

The subgraph 474 is a chart of multiple power consumption curves over the same example days as in the subgraph 472. The subgraph 474 includes a total power consumption curve 480 that represents a total power consumption (or energy consumption) required to operate multiple storage rooms in a refrigeration facility. The area underneath the total power consumption curve 480 represents the amount of thermal power (or energy) consumed over time. The area under the total power consumption curve 480 can be summed to determine a total thermal power consumption during a predetermined period of time. In the illustrated example, the total power consumption curve 480 represents a total power consumption for four storage rooms. A thermal energy consumed for each storage room is illustrated as part of the area underneath the total power consumption curve 480. In the illustrated example, a thermal energy consumption for a first storage room is illustrated as a first portion 482A, a thermal energy consumption for a second storage room is illustrated as a second portion 482B, a thermal energy consumption for a third storage room is illustrated as a third portion 482C, and a thermal energy consumption for a fourth storage room is illustrated as a fourth portion 482D. In the subgraph 474, however, the fourth portion 482D is rarely visible because the thermal energy consumption of the fourth storage room is substantially small relative to the other storage rooms.

The total power consumption curve 480 corresponds time wise with drops 484 in the usage rate curve 478. For example, when the usage rate is low (e.g., during each drop 484 in the usage rate curve 478), more power is consumed to run a refrigeration system to drop the air temperature within a warehouse. In contrast, when the usage rate is relatively high (e.g., during each rise 486 in the usage rate curve 478), less power is consumed as part of leaving the air temperature within the warehouse to rise.

The subgraph 476 is a chart of several temperature curves over the same example days as in the subgraphs 472 and 474. First, second, third, and fourth temperature curves 488A, 488B, 488C, and 488D indicate air temperatures within the first, second, third, and fourth storage rooms, and thus correspond with the first, second, third, and fourth portions 482A, 482B, 482C, and 482C of thermal consumption in the subgraph 474. As illustrated, different storage rooms in a warehouse can have different behaviors of air temperatures therewithin at least partly because the factors that affect the cooling of each of the storage rooms can be different. For example, each storage room can be affected by different factors, such as local weather, solar and/or wind effects, production and/or logistics schedules, inventories with different thermal characteristics, temperature requirements, etc. Accordingly, each of multiple storage rooms in a refrigeration system can be controlled differently according to different factors, while considering the usage rate 478 that varies over time. As described herein, the operational schedule 138 can provide an optimal operational schedule for controlling a refrigeration system for a warehouse that has one or more storage rooms that may be operated in different manners.

Figure 4C:
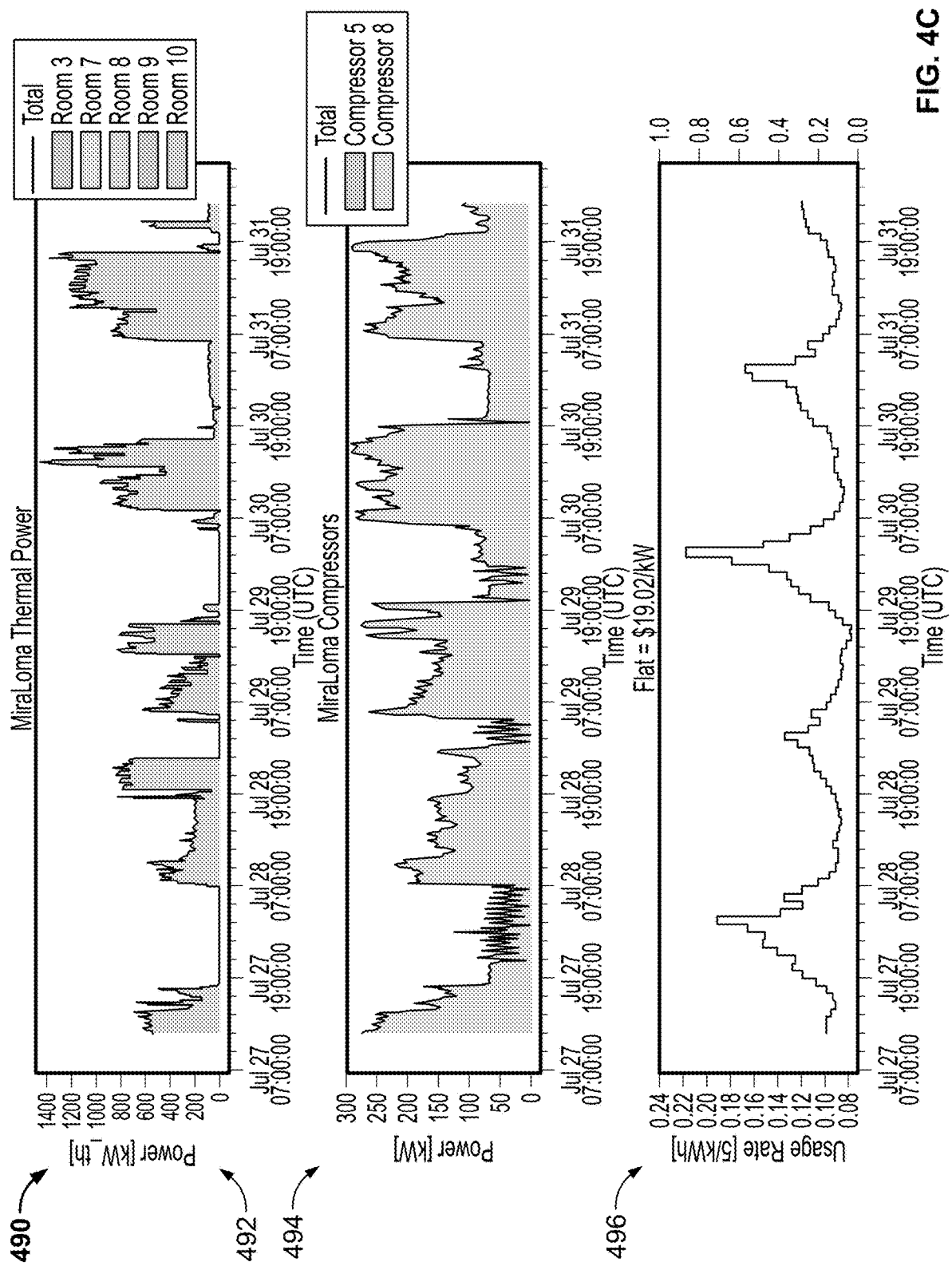
FIG. 4C is a graph depicting an example usage rate for a refrigeration facility having multiple storage rooms.

FIG. 4C is a graph depicting an example usage rate for a refrigeration facility having multiple storage rooms. While FIGS. 4A and 4B illustrate tiered usage rates, FIG. 4C shows a day head market usage rate. While FIGS. 4A and 4B show theory and algorithm outputs, FIG. 4C shows an experimental result. In some implementations, the graph can be an example of the behavior of a refrigeration facility that is configured to use operational schedules, such as the example operational schedules 138, 142 of FIG. 1, which are configured to implement time-shifted cooling strategies.

A subgraph 492 shows the amount of thermal power removed from the temperature controlled rooms by the evaporators. A subgraph 494 shows the power draw from the compressors tied to those same rooms. A subgraph 496 shows the usage rates, which are published 24 hours before.

Figure 5:
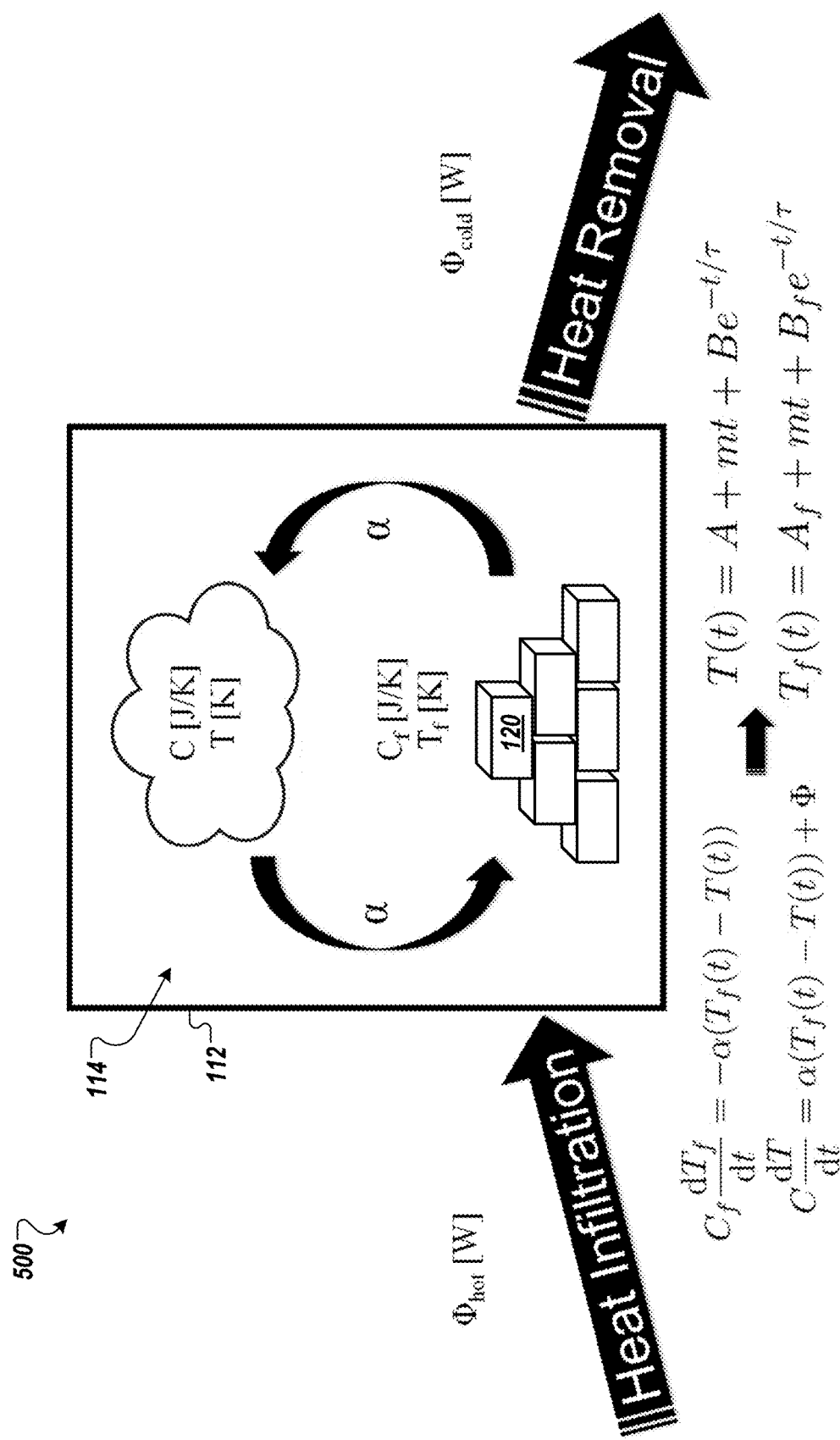
FIG. 5 is a conceptual diagram of a thermal model of the warehouse of the example refrigeration system.

FIG. 5 is a conceptual diagram of a thermal model 500 of the warehouse 112 of the example refrigeration management system 100 of FIG. 1. In general, the thermal behavior of a refrigerated space can be mathematically modeled as a dampened harmonic oscillator. In some implementations, the thermal behavior of a refrigerated space in response to powered cooling and passive heating (e.g., heat intrusion) can mathematically approximate the electrical behavior of a battery in response to powered charging and passive discharge through a load (e.g., self-discharge). For example, the enclosed space 114 within the warehouse 112 can be "charged" by removing an additional amount of heat energy (e.g., dropping the temperature below the normal operating temperature, generally by using electrical power) from the air and the inventory 120, and can be "discharged" by allowing heat to infiltrate the enclosed space 114 (e.g., until the normal operating temperature is reached).

The thermal model 500 can be determined at least partly by empirical measurement. For example, the enclosed space 114 can start at an initial temperature (e.g., −1° F.), and cooled to a predetermined lower temperature (e.g., −5° F.). The cooled air and the inventory 120 exchange thermal energy as the temperature changes. A collection of temperature sensors distributed within the enclosed space 114 can be monitored to determine when the enclosed space 114 has reached the lower temperature. When the lower temperature has been reached and/or stabilized, the warehouse's 112 refrigeration system can be partly turned down or completely turned off (e.g., thereby reducing power usage) and the sensors can be used to monitor the dynamic temperature changes across the enclosed space 114 as heat intrusion causes the enclosed space 114 to gradually warm (e.g., back toward −1° F.), with the air and the inventory 120 absorbing some of the heat that infiltrates the enclosed space 114.

The rates at which the enclosed space 114 cools and warms can be analyzed to estimate the thermal capacity and/or determine the thermal resistance of the warehouse 112. In some embodiments, the thermal capacity can be based on the refrigeration capacity of the warehouse 112 (e.g., the perturbance capacity of the system, the size of the refrigeration system 130), the volume of the air and the volumes and the types of materials that make up the inventory 120 (e.g., thermal capacity of frozen fish versus frozen concentrated orange juice, paper packaging versus metal packaging).

In some embodiments, the thermal resistance can be based on the insulative qualities of the warehouse 112, the insulative qualities of the inventory 120 (e.g., stored in plastic vacuum sealed packages versus corrugated cardboard boxes), heat given off by workers and/or equipment within the warehouse 112, and the frequency with which doors to the warehouse 112 are opened to ambient temperatures. In some embodiments, some or all of the terms of the thermal model 500 can be determined by performing a thermal modeling cycle and monitoring the thermal response of the warehouse 112. For example, if the thermal modeling cycle is performed while a particular type and volume of the inventory 120 is stored, while particular amounts of equipment and workers are used in the enclosed space 114, and while the doors to the enclosed space 114 are opened and closed with a particular frequency, then the resulting thermal model can inherently include terms that reflect those variables without requiring these contributing factors to be determined ahead of time.

The mathematical embodiment of the thermal model 500 takes the form of differential equations such as:

$$C_f \frac{dT_f}{dt} = -\alpha(T_f(t) - T(t)), \text{ and } C\frac{dT}{dt} = \alpha(T_f(t) - T(t)) + \Phi$$

in which $\Phi$ represents net thermal flux, $\alpha$ represents the thermal coupling coefficient between the food and air, C represents the effective heat capacity of the air, $C_f$ is the effective heat capacity of the inventory, $T_f$ represents the temperature of the inventory, and T represents the temperature of the air.

The preceding equations can be solved analytically or numerically in order to determine the time-dependent air and inventory temperature. The model is analogous to and approximates the dynamics of a dampened simple harmonic oscillator. In thermal harmonic oscillator form, the preceding equations can be presented as:

$$T(t) = A + mt + Be^{-t/\tau}, \text{ and } T_f(t) = A + mt \; B_f e^{-t/\tau}$$

Figure 6:
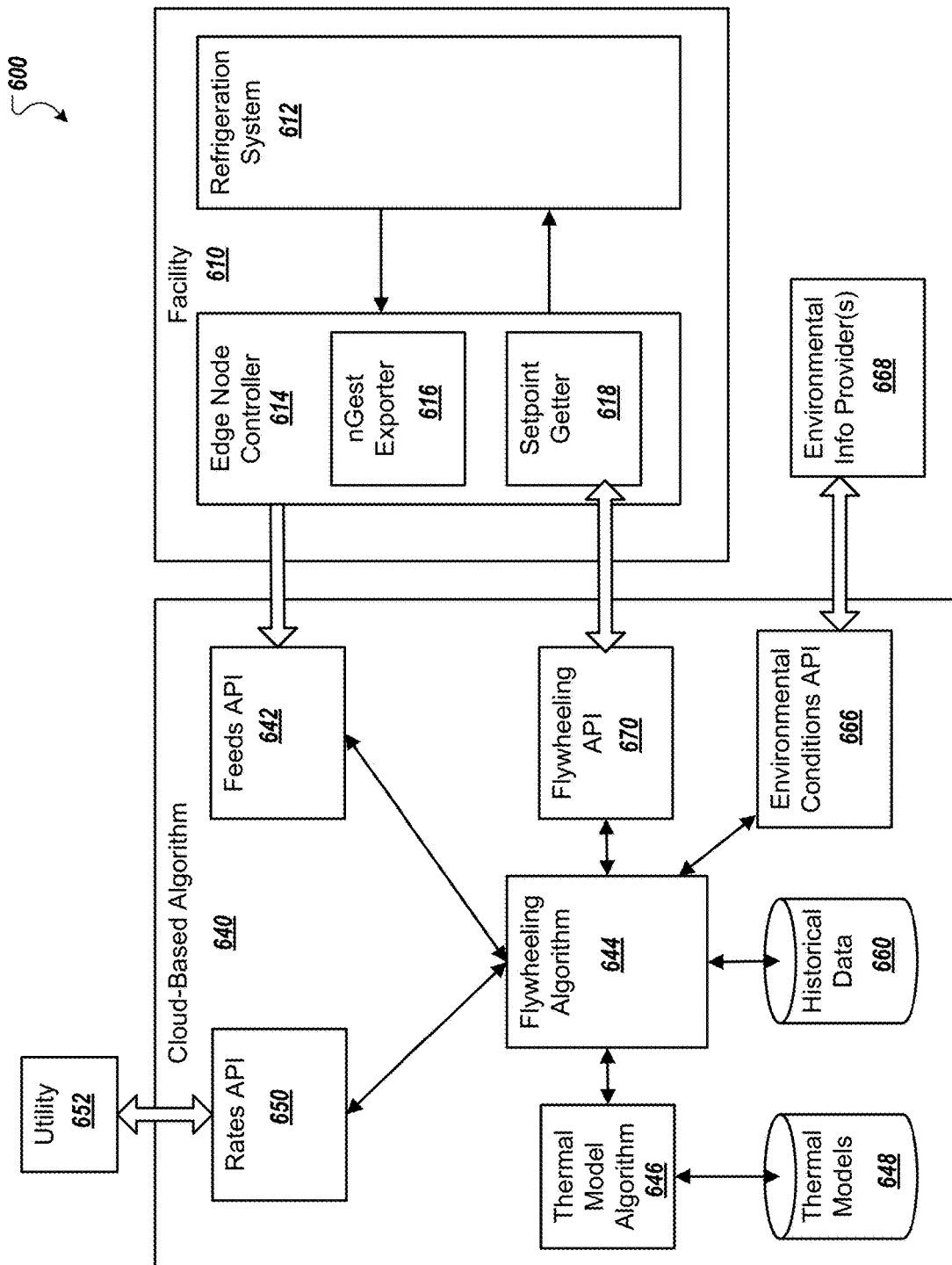
FIG. 6 is a block diagram of an example refrigeration management system.

FIG. 6 is a block diagram of an example refrigeration management system 600. The system 600 illustrates example interactions between a facility 610 and a cloud-based algorithm 640. In some embodiments, the facility 610 can be the refrigeration facility 110 of the example refrigeration management system 100 of FIG. 1. In some embodiments, the cloud-based algorithm 640 can be the scheduler 140.

The facility 610 includes a refrigeration system 612. In some embodiments, the refrigeration system can be configured to cool an enclosed space. For example, the refrigeration system 612 can be the refrigeration system 130.

The facility 610 includes an edge node controller 614 in communication with the refrigeration system 612. The edge node controller includes an export module 616 and a setpoint module 618. Export module 616 is configured to export information received from the refrigeration system 612, such as measured temperature values, temperature setpoint values, operational status information, and/or other information from the refrigeration system 612. The setpoint module 618 is configured to receive operational schedules from the cloud-based algorithm 640. In some embodiments, the cloud-based algorithm 640 can be a server computer system and the edge node controller 614 can be a client processor system. The edge node controller 614 is configured to perform functions based on the operational schedules, such as turning the refrigeration system 612 on and off (e.g., or to a reduced power configuration) at predetermined times, and/or configuring temperature setpoints for the refrigeration system 612 at predetermined times.

The cloud-based algorithm 640 includes a feeds application programming interface (API) 642. The feeds API 642 provides a programmatic communications endpoint that is configured to receive operational information from the edge node controller 614. The operational information includes timed temperature measurements from one or more sensors located throughout the refrigeration system 612. In addition or alternatively, the operational information can include information, such as refrigeration capacity information (e.g., a schedule that indicates that 10% of the chillers used by the refrigeration system 612 will be offline for maintenance tomorrow), operational volume information (e.g., how full the warehouse is expected to be), operational status information (e.g., the facility 610 will be operating when it is normally closed, and doors and equipment will be contributing heat when they normally would not, such as during a temporary second work shift or on a Sunday), and/or other conditions and properties of the facility 610 (including its refrigeration system and warehouse).

In addition or alternatively, the operational information includes operational conditions of one or more components in the refrigeration system, such as a condenser, a compressor, an expansion valve, an evaporator, an accumulator, and a fan assembly. For example, a condenser pressure is monitored and obtained as part of the operational information because it can be affected by environmental conditions, such as ambient temperature external to the refrigeration system.

A flywheeling algorithm 644 receives the operational information via the feeds API 642. For example, the flywheeling algorithm 644 can include or be part of the optimal schedule determination module 444 in FIG. 1. The flywheeling algorithm 644 can include a convex optimization logic which can determine operational schedules for the refrigeration system 612. In general, the flywheeling algorithm 644 determines operational schedules that can cause the refrigeration system 612 to precool a cold storage space, and then allow the space to "flywheel", "coast", "discharge" or otherwise allow the temperature of the space to rise for a period of time without needing to consume power in order to keep the storage space below a predetermined maximum temperature limit.

The flywheeling algorithm 644 communicates with a thermal modelling algorithm 646 that includes the software logic that determines thermal models for spaces, such as the spaces cooled by the refrigeration system 612, based on the operational information received by the feeds API 642. The thermal modelling algorithm 646 is configured to store and retrieve thermal models in a thermal models database 648. In some implementations, the thermal models can be the example thermal model 500 of FIG. 5.

The flywheeling algorithm 644 communicates with a power rates API 650. The power rates API 650 provides a communications interface to a utility provider 652. The power rates API 650 enables the cloud-based algorithm 640 to request and/or receive energy cost schedules from the utility provider 652. For example, the power rates API 650 could be used to receive the energy cost schedule 162 of FIG. 1 from the utility provider 160.

A historical data database 660 stores historical data that can be retrieved by the flywheeling algorithm 644. For example, the historical data database 660 can store multiple sets of operational information for the facility 610 over time, and the flywheeling algorithm 640 can use such historical data as part of a process of determining operational schedules. For example, the flywheeling algorithm 644 can look at multiple sets of historical data to determine that the facility 610 warms up more quickly on Mondays, has an average amount of warming on Tuesdays-Fridays, and has little warming on Saturdays and Sundays (e.g., Mondays may be heavy shipping days with lots of activity and door openings, and the facility 610 may be closed for business on weekends and therefore have few to zero door openings). In another example, the flywheeling algorithm 644 can look at multiple sets of historical data to determine that the facility 610 warms up more quickly in the summer than in the winter. The flywheeling algorithm 644 can use information such as this to predict and/or improve estimations of the thermal model of the facility 610 for various days, seasons, and other operational variables.

The flywheeling algorithm 644 communicates with an environmental conditions API 666. The environmental conditions API 666 provides a communications interface to one or more environmental information providers 668. The environmental conditions API 666 enables the cloud-based algorithm 640 to request and/or receive environmental information from one or more of the environmental information providers 668. For example, the environmental conditions API 666 could be used to receive the environmental information 172 of FIG. 1 from one or more of the environmental information providers 170.

The flywheeling algorithm 644 determines one or more operational schedules for controlling the refrigeration system 612 for the facility 610 based on at least one of the energy cost schedules received by the power rates API 650, the thermal models determined by the thermal model algorithm 646, the operational information received by the feeds API 642, the historical data retrieved from the historical data database 660, and the environmental information received by the environmental conditions API 666. For example, the flywheeling algorithm 644 can determine operational schedules 142 including an optimal operational schedule 138.

As described herein, the flywheeling algorithm 644 can determine an optimal operational schedule 138 using a convex optimization logic. Such a convex optimization logic can be configured to select the optimal operational schedule 138 among a plurality of candidate operational schedules 142, which will optimize an energy cost and/or an energy consumption in operating the refrigeration system 612 for the facility 610 having one or more storage rooms.

In some implementations, the convex optimization logic of the flywheeling algorithm 644 can be represented by a real power cost function: $c^T X + k_d \max(X)$ subject to $0 \leq X \leq M$ $$C_f(T_f(t+1) - T_f(t)) = \alpha(T_w(t) - T_f(t))$$

$$C(T_w(t+1) - T_w(t)) = \alpha(T_f(t) - T_w(t)) + \Phi_{hot}(t) - \Phi_{cold}(t)$$

$$\Phi_{hot}(t) = (k_1 + k_2 d(t))(T_o(t) - T_w(t)) + k_3 X(t)$$

$$\Phi_{cold}(t) = k_4 X(t)\left(\frac{T_w}{T_o(t) - T_w(t)}\right)$$

$$T_w \leq 0$$

where $c^T X$ represents energy consumption (or a transpose of a usage charge vector over time), X represents refrigeration systems power consumption over time, $k_d \max(X)$ represents demand charge, $\Phi$ represents net thermal flux, a represents the thermal coupling coefficient between the food and air, C represents the effective heat capacity of the air, $C_f$ is the effective heat capacity of the inventory, $T_f$ represents the temperature of the inventory, T represents the temperature of the air, $\Phi_{hot}$ is the time dependent heat flux (in Watts), $k_1$ is the rate of heat transfer through the walls (infiltration), $k_2$ is the rate of heat transfer for a door opening to a temperature controlled space, d(t) is the time dependent door openings (in Watts), $T_o$ is the ambient temperature outside the warehouse, $k_3$ is the rate of heat transfer associated with running the evaporator fans in the cold space, $\Phi_{cold}$ is the time dependent cooling flux (in Watts), $$\frac{T_w}{T_o(t) - T_w(t)}$$

is the standard theoretical Carnot efficiency equation for a refrigeration system, $k_4$ is a multiplicative scaling term used to represent the actual efficiency of the refrigeration system (as Carnot is theoretical and not achievable in practice). An optimal operational schedule 138 can be determined by finding X that minimizes the function above. $C_f(T_f(t+1) - T_f(t)) = \alpha(T_w(t) - T_f(t))$ describes how the warehouse temperature changes versus time. $C(T_w(t+1) - T_w(t)) = \alpha(T_f(t) - T_w(t)) + \Phi_{hot}(t) - \Phi_{cold}(t)$ describes how the goods temperature changes versus time. It is noted that the real power cost function $c^T X + k_d \max(X)$ is convex but not linear.

A flywheeling API 670 provides a communication interface between the cloud-based algorithm 640 and the edge node controller 614. The flywheeling API 670 can transmit operational schedules that are received by the setpoint getter 618. The edge node controller 614 uses operational schedules received by the setpoint getter 618 to operate the refrigeration system 612. The operational schedules include information that can cause the edge node controller 614 to operate the refrigeration system 612 to chill a freezer or other enclosed space to a lower temperature (e.g., pre-chilling, charging) during times when power is relatively less expensive and/or when the refrigeration system 612 can be operated more efficiently (e.g., during cooler hours), and allow the temperatures to rise while not operating (e.g., discharging, flywheeling, coasting, relaxing) during other times when power is relatively more expensive (e.g., peak pricing periods) and/or less efficient (e.g., hot hours of the day).

Figure 7:
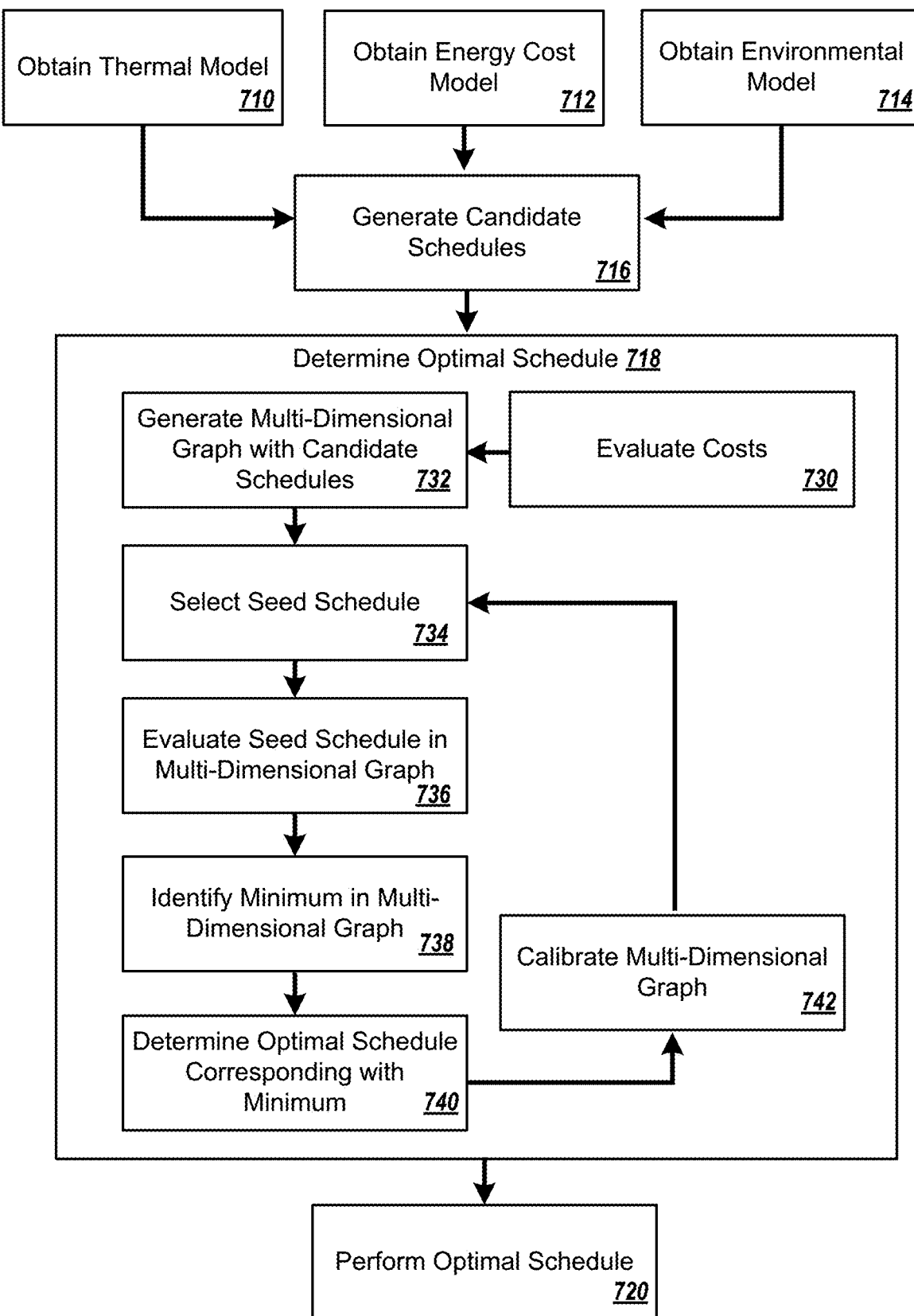
FIG. 7 is a flow diagram of an example process for refrigeration management.

FIG. 7 is a flow diagram of an example process 700 for refrigeration management. The process 700 can be performed by parts or all of the example refrigeration management system 100 of FIG. 1 or the example refrigeration management system 600 of FIG. 6.

At 710, a thermal model of an overall system of a refrigeration facility is obtained. The overall system of a refrigeration system can include a cold storage facility (e.g., a warehouse or a cold storage enclosure) and a refrigeration system that operates to cool the cold storage facility. For example, the scheduler 140 can receive timed readings from the sensors 134 and operational information about the refrigeration system 130, and determine a thermal model of the overall system of the refrigeration facility based on the timed readings and/or the operational information. Alternatively, the thermal model is generated for either of the cold storage facility and the refrigeration system. An example process of determining a thermal model is described in more detail herein, for example with reference to FIG. 8.

In some implementations, the thermal model can be representative of at least one of the thermal capacity of content within the enclosed space, and the thermal resistance of the cold storage enclosure. For example, the air and the inventory 120 within the enclosed space 114 would have a combined thermal capacity, and the construction (e.g., insulative properties, areas of doors) of the warehouse 112 would contribute to the thermal resistance of the warehouse 112. In addition or alternatively, the thermal model can be representative of operational information of the refrigeration system 130 for cooling the warehouse 112. For example, the thermal model of the system can be affected by at least one of the operational conditions of components of the refrigeration system 130, such as power consumptions of each component (e.g., a condenser, a compressor, an expansion valve, an evaporator, an accumulator, and a fan assembly), heat generation of each component (e.g., a condenser, a compressor, an expansion valve, an evaporator, an accumulator, and a fan assembly), condenser pressure, and other operational statuses and conditions of refrigeration system components. In addition or alternatively, the thermal model can be affected by other factors associated with operations of the refrigeration system, such as temperature requirements/settings/thresholds, a maximum allowed temperature for the enclosed space, nominal temperature setpoint of the refrigeration facility, maximum temperature setpoint of the inventory, etc.

At 712, an energy cost model is obtained. The energy cost model describes a schedule of variable energy costs over a predetermined period of time in the future. For example, the scheduler 140 can receive the energy cost schedule 162 from the utility provider 160. The energy cost schedule 162 includes information about the energy cost that the utility provider 160 charges for energy at different times and/or different days. The energy cost can be represented in one or more of various types, such as usage rates, such as fixed rates, step rates, time-of-use rates, demand rates, demand charges, etc. A demand charge is based on the highest amount of power (the peak electricity usage) of a customer reached during a predetermined time interval average (e.g., 15, 20, 30, or 60-minute average) during a billing period. The utility then charges a fixed amount (as a multiplier). For example, demand charges are somewhat analogous to a speeding ticket. The utility can charge a fee (i.e., demand charge) based on the maximum power draw for the month, and in some examples this fee can be as much as 50% of the power bill. The scheduler 140 can be configured to account for such fees when determining operational schedules, in order to prevent too much of the refrigeration equipment from turning on at once even when power rates are relatively low.

At 714, an environmental model is obtained. The environmental model describes one or more environmental conditions over a predetermined period of time in the future. The environmental model can include the environmental conditions that are external to a cold storage facility and in a geographical area where the cold storage facility is located. For example, the scheduler 140 can receive the environmental model from one or more environmental information providers 170. Alternatively, the scheduler 140 is configured to determine the environmental model based on the environmental information 172 received from one or more of the environmental information providers 170.

At 716, one or more operational schedules are determined for at least a portion of the refrigeration system based on one or more of the thermal model, the energy cost model, and the environmental model. Operational schedules are determined to meet a plurality of constraints provided by the one or more of the thermal model, the energy cost model, and the environmental model, while the operational schedules may result in different operational outcomes, such as different operational efficiencies. One or more of the determined operational schedules can be used as candidates (e.g., candidate operational schedules) for an optimal operational schedule.

In some implementations, one or more of multiple operational schedules can be determined by the scheduler 140. For example, the scheduler 140 can analyze the energy cost schedule 162 to identify a period of time in which the per-unit cost of power (e.g., dollars per kilowatt hour for electricity) is relatively high, and then identify another period of time in which the per-unit cost of power is relatively lower and precedes the high-cost period (e.g., identify a low price period that occurs before a peak price period). The scheduler 140 can then determine that at least a portion of the low-price period is to be used for chilling the enclosed space 114 an additional amount below the nominal temperature setpoint. The scheduler 140 can also determine that the refrigeration system 130 should not be operated any more than necessary to maintain the maximum temperature setpoint of the inventory 120. As such, the schedule can cause the controller 132 to provide the enclosed space 114 with an extra thermal charge of cooling using cheap power so the inventory can stay below the maximum temperature for at least a while without consuming expensive power.

In addition or alternatively, one or more multiple operational schedules can be determined such that the controller 132 can turn the refrigeration system 130 on and keep it on until a predetermined condition is set, such as by setting the temperature setpoint to a temperature below what the enclosed space 114 will reach in a practical amount of time (e.g., −20° F.) to cause the refrigeration system 130 to run substantially constantly for a predetermined amount of time. In another example, the controller 132 can run the refrigeration system 130 until a predetermined temperature (e.g., −6° F.) has been reached and/or stabilized. The controller 132 can then shut the refrigeration system 130 off (e.g., or reduce power usage) and start recording the temperatures sensed by the sensors 134 to over time as the enclosed space 114 is allowed to warm. The controller 132 and/or the scheduler 140 can process the timed temperature measurements to determine the thermal model 500.

In addition or alternatively, one or more of multiple operational schedules can be determined based at least in part on demand charges. Demand charges are somewhat analogous to a speeding ticket. The utility can charge a fee (i.e., demand charge) based on the maximum power draw for the month, and in some examples this fee can be as much as 50% of the power bill. The scheduler 140 can be configured to account for such fees when determining the schedule, in order to prevent too much of the refrigeration equipment from turning on at once even when power rates are relatively low.

At 718, an optimal operational schedule is determined from the candidate operational schedules that have been determined based on one or more of the thermal model, the energy cost mode, and the environmental model. An example method of determining an optimal operational schedule is described in more detail below.

At 720, the determined optimal operational schedule is performed. In some implementations, the optimal operational schedule 138 is configured to cause the refrigeration system 130 to cool the enclosed space 114 by an additional amount below the nominal temperature setpoint during a period of time during which the utility provider 160 charges a relatively lesser price for power, and stops the additional cooling and allows the enclosed space 114 to warm back toward the predetermined nominal temperature threshold during a period of time during which the utility provider 160 charges a relatively greater price for power. In addition or alternatively, the optimal operational schedule 138 can be configured to allow the enclosed space 114 to warm back toward a predetermined maximum temperature (e.g., from −4.1° F. to a limit of −1.3° F.) and once the predetermined maximum temperature is approached, the refrigeration system 130 can resume normal operations (e.g., consuming power as needed in order to keep the enclosed space 114 at or below −1.3° F.). An example process of performing the optimal operational schedule is described in more detail herein, for example with reference to FIG. 9.

Figure 8:
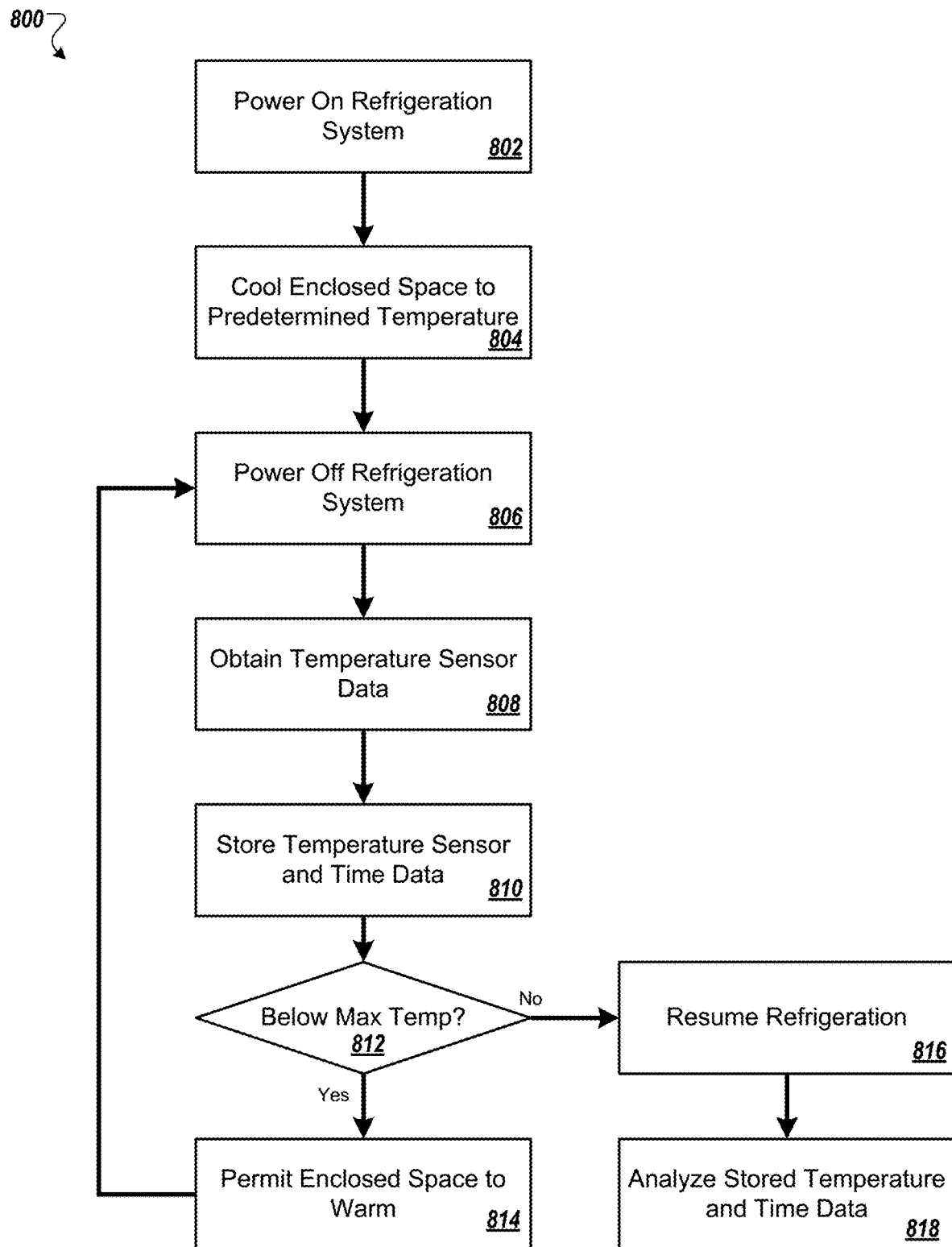
FIG. 8 is a flow diagram of an example process for determining a thermal model.

FIG. 8 is a flow diagram of an example process 800 for determining a thermal model. In some implementations, the process 800 can be the example step 710 of FIG. 7. In some implementations, the process 800 can be performed by parts or all of the example refrigeration management system 100 of FIG. 1 or the example refrigeration management system 600 of FIG. 6. In some implementations, the process 800 can be used to determine the example thermal model 500 of FIG. 5.

At 802, a refrigeration system is powered on. For example, the controller 132 can configure the refrigeration system 130 to power on by setting the target temperature to −4° F.

At 804, an enclosed space is cooled to a predetermined temperature. For example, the enclosed space 114 and the inventory 120 can be cooled to −4° F.

At 806, the refrigeration system is turned off. For example, the controller 132 can configure the refrigeration system 130 to power off by setting the target temperature to −1° F. In some implementations, the refrigeration system can be put into a reduced power consumption configuration instead of being turned off. For example, half or three-quarters of the chillers in a system can be turned off while the remainder are left powered on. In another example, some or all of the refrigeration system can be modulated (e.g., pulsed) to operate only in several-minute intervals when needed.

At 808, temperature sensor data is obtained. At 810, the temperature sensor and time data is recorded. For example, the controller 132 can monitor the sensors 134 to record temperature readings from within the enclosed space 114 along with time-stamp information based on the chronometer 136.

At 812, a determination is made. If the temperature of the enclosed space is below a predetermined maximum temperature setpoint (e.g., chosen to prevent the inventory 120 from getting too warm), then the enclosed space is allowed to continue warming at 814. If the temperature of the enclosed space is not below the predetermined maximum temperature setpoint, then refrigeration resumes at 816 (e.g., the refrigeration system 130 is turned back on).

At 818, the stored temperature and time data is analyzed to determine a thermal model of the enclosed space. For example, the controller 132 and/or the scheduler 140 can process the collected timestamped temperature readings of the warming enclosed space 114 to determine the thermal model 500.

Figure 9:
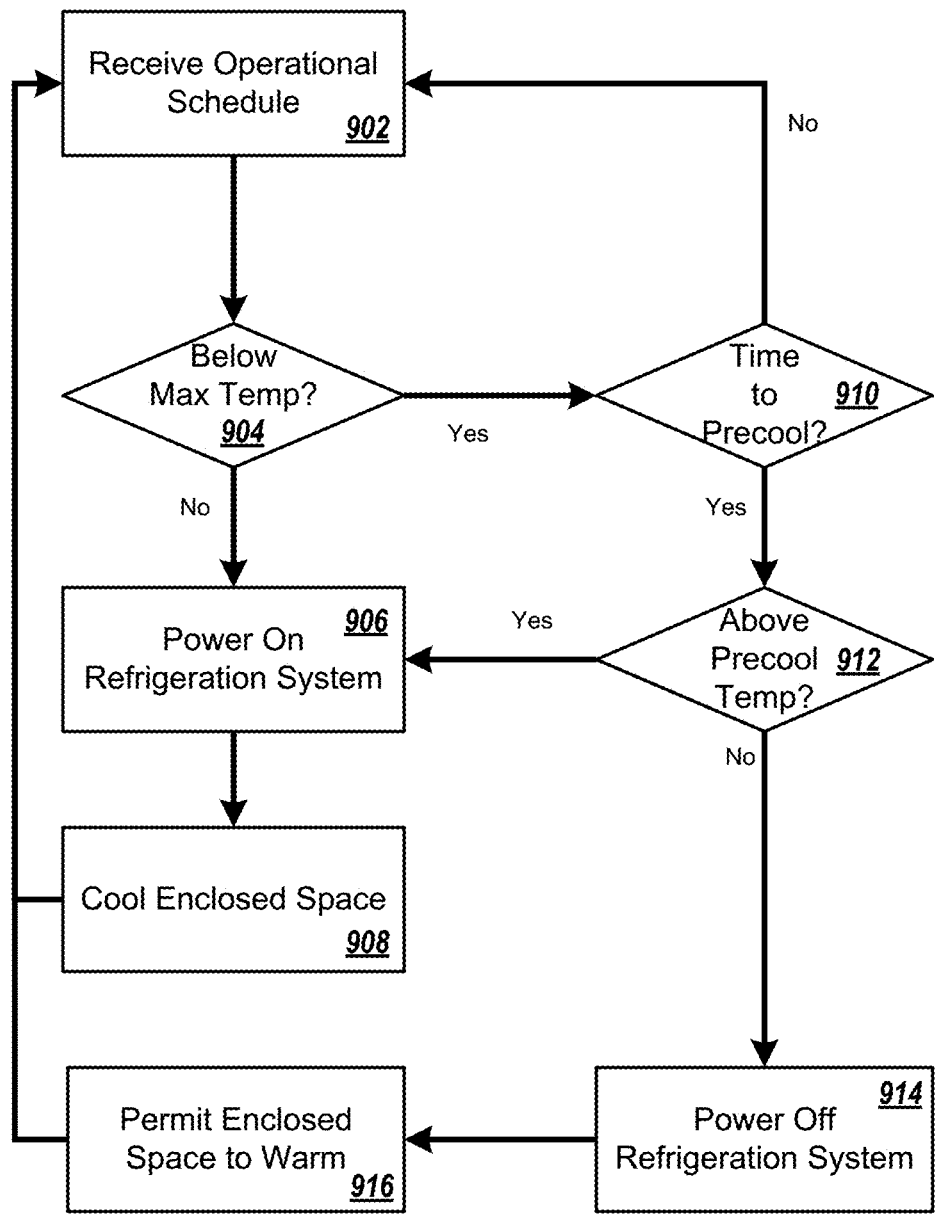
FIG. 9 is a flow diagram of an example process for refrigeration schedule implementation.

FIG. 9 is a flow diagram of an example process for refrigeration schedule implementation. In some implementations, the process 900 can be the example step 720 of FIG. 7. In some implementations, the process 900 can be performed by parts or all of the example refrigeration management system 100 of FIG. 1 or the example refrigeration management system 600 of FIG. 6.

At 902, an operational schedule is received. For example, the controller 132 can receive the operational schedule 138 from the scheduler 140.

At 904, a determination is made. If the temperature of an enclosed space is not below a predetermined maximum threshold temperature, then a refrigeration system is powered on at 906 and the enclosed space is cooled at 908. For example, if the enclosed space 114 reaches 0° F. when the thermostatic setpoint of the refrigeration system 130 is −1° F., then the refrigeration system 130 can turn on to cool the enclosed space 114. The process 900 continues at 902.

If at 904 the temperature of an enclosed space is below the predetermined maximum threshold temperature, then another determination is made at 910. If it is not time to precool the enclosed space, then the process continues at 902. For example, if the chronometer 136 indicates that the current time is not a time that is identified by the operational schedule 138 as a precooling (e.g., charging) time, then the controller 132 can check for a new operational schedule and/or continue monitoring the time and temperature of the enclosed space 114.

If at 910 it is time to precool, then another determination is made at 912. If the temperature of the enclosed space is above a predetermined precooling temperature, then the refrigeration system is powered on at 906. For example, if the chronometer 136 indicates that the current time is a time that is identified by the operational schedule 138 as a precooling (e.g., charging) time, then the controller 132 can set the temperature setpoint of the warehouse 120 to −4° F., and if the temperature of the enclosed space 114 is above the setpoint, the refrigeration system 130 can be turned on to cool the enclosed space 114.

If the temperature of the enclosed space is not above the predetermined precooling temperature, then the refrigeration system is powered off or put into a reduced power mode at 914, and the enclosed space is allowed to warm at 916. For example, the enclosed space 114 can be held at the predetermined lower precooling temperature of −4° F. until the precooling period ends.

Referring still to FIG. 7, an optimal operational schedule can be determined using an iterative optimization algorithm. For example, the block 718 includes blocks 730, 732, 734, 736, 738, 740, and 742.

At 730, costs for operating a refrigeration facility are evaluated according to a plurality of candidate operational schedules, such as the candidate operational schedules generated based on at least one of the thermal model, the energy cost model, and the environmental model at block 716. As described herein, each of the candidate operational schedule is designed to solve all constraints required by one or more of the thermal model, the energy cost model, and the environmental model, although the candidate operational schedules may result in different costs for operating a refrigeration facility. The candidate operational schedules can be determined for one or more points in time over a predetermined period of future time. The candidate operational schedules can provide different levels of cooling of a refrigeration facility at different points in time. Such different levels of cooling can be achieved by consuming different levels of electric power for operating a refrigeration system for a cold storage facility (e.g., a warehouse or a cold storage enclosure) in the refrigeration facility.

The costs for operating the refrigeration facility can include costs for cooling a warehouse using a refrigeration system. The costs can represent efficiency of the plurality of respective candidate operational schedules when the respective candidate operational schedules are executed in controlling the refrigeration system for the refrigeration facility. Each of the costs can indicate a combination of an energy cost and an energy consumption according to each of the candidate operational schedules. For example, a cost of a candidate operational schedule can be indicative of a summation of an energy cost and an energy consumption that incur when the candidate operational schedule is implemented to control the refrigeration facility. The combination of an energy cost and an energy consumption can take different forms of calculation, such as multiplication, division, subtraction, logarithm, $n^{th}$ root, exponentiation, any combinations thereof with or without summation, and any other suitable calculation.

Alternatively, each of the costs can indicate an energy cost according to each of the candidate operational schedules. For example, a cost of a candidate operational schedule can be indicative of an energy cost that incurs when the candidate operational schedule is implemented in operating the refrigeration facility. Alternatively, each of the costs can indicate an energy consumption according to each of the candidate operational schedules. For example, a cost of a candidate operational schedule can be indicative of an energy consumption that incurs when the candidate operational schedule is implemented in operating the refrigeration facility.

Figure 10:
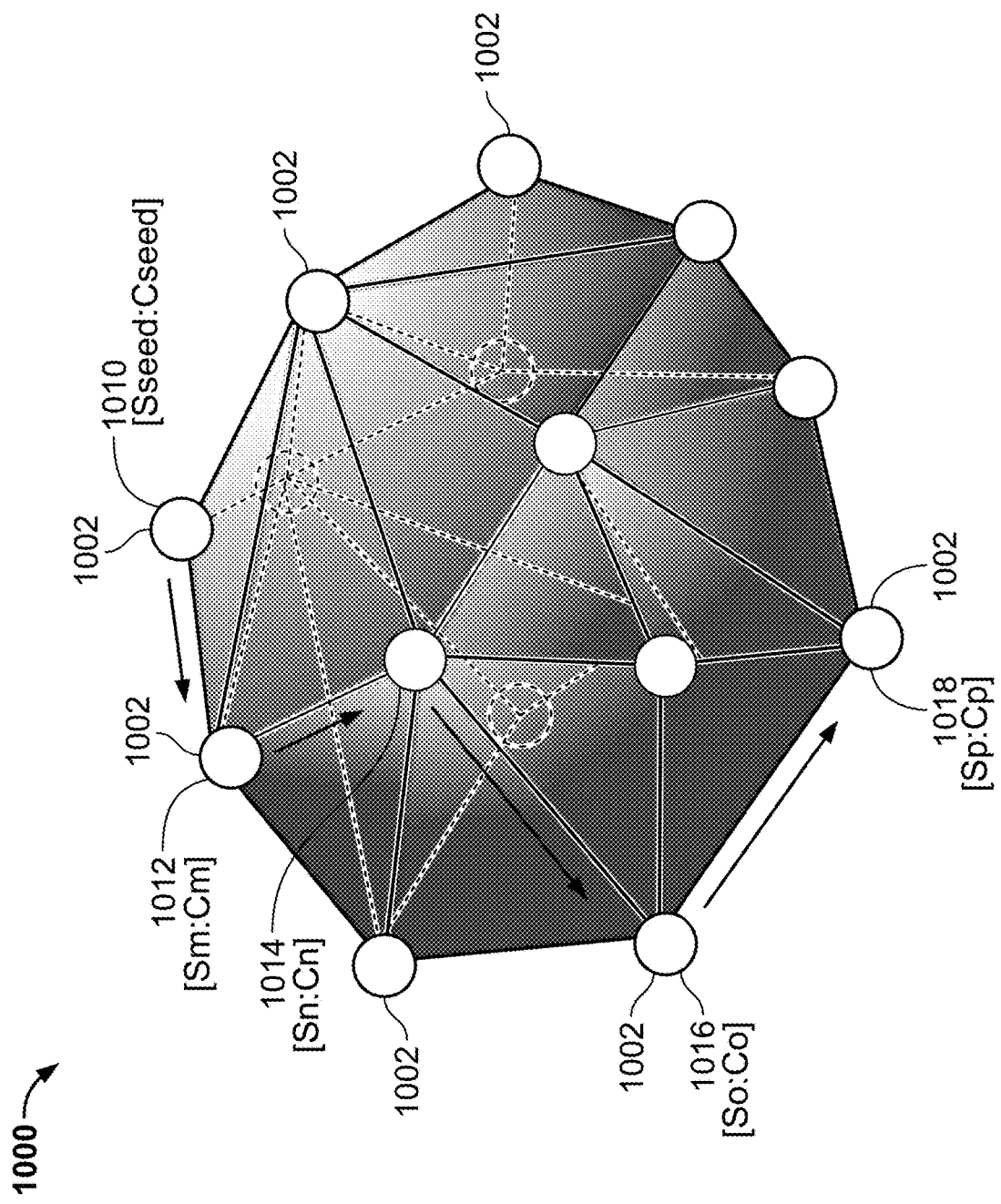
FIG. 10 is a conceptual illustration of an example multi-dimensional graph to represent a plurality of candidate operational schedules.

At 732, a multi-dimensional graph is generated, which provides the costs for operating the refrigeration facility according to the plurality of candidate operational schedules. In some implementations, the dimension of the graph can be determined at least by the number of constraints required by one or more of the thermal model, the energy cost model, and the environmental model. A conceptual illustration of an example multi-dimensional graph is shown in FIG. 10.

At 734, a seed schedule is selected from the plurality of candidate operational schedules. The seed schedule can be selected randomly among the plurality of candidate operational schedules. Alternatively or in addition, the seed schedule can be selected to satisfy one or more predetermined requirements which are associated with one or more of the thermal model, the energy cost model, and the environmental model.

At 736, the seed schedule is evaluated in the multi-dimensional graph using an optimization algorithm. In some implementations, a cost of the seed schedule can be compared to the costs of the plurality of candidate schedules to identify one of the plurality of candidate schedules having a minimal cost among all or a subset of the plurality of candidate schedules. For example, a cost of the seed schedule is compared to the cost of a first one of the candidate schedules. If the cost of the seed schedule is smaller than the cost of the first one of the candidate schedules, the seed schedule is compared with the cost of a second one of the candidate schedules to determine which of the seed schedule and the second one of the candidate schedules is smaller. If the cost of the seed schedule is greater than the cost of the first one of the candidate schedules, the first one of the candidate schedules is then compared with the cost of a second one of the candidate schedules to determine which of the first one and the second one is smaller. This process can repeated until one of the plurality of candidate schedules is identified having a minimal cost.

In some implementations, the optimization algorithm includes a convex optimization logic, which is to minimize a convex function over a convex set. A real-valued function defined on an n-dimensional interval is called convex if a line segment between any two points on the graph of the function lies above or on the graph. In other words, a function is convex if its epigraph (the set of points on or above the graph of the function) is a convex set. A convex set is a subset of an affine space that is closed under convex combinations. Specifically, in a Euclidean space, a convex region is a region where, for every pair of points within the region, every point on the straight line segment that joins the pair of points is also within the region. Convex functions are useful because they have no more than one minimum in a multi-dimensional space with or without suitable hypotheses.

In some implementations, the convex optimization logic performs one or more of the following processes: (1) numbers are determined which satisfy a predetermined set of constraints and, when input into an objective function, minimize the value of that function, and (2) the convex optimization uses numerical solvers and numerous results in applied mathematics to guarantee that, if the constraints represent a convex set and the objective function is convex, then the result calculated by the solver is a strictly optimal set of inputs. There could be others that are as good, but not others that are better.

The convex optimization logic used herein may be understood by a few examples of convex optimization problems used in other contexts. Examples include the minimum-fuel descent profile for an airliner, subject to the airliner not crashing and not dropping at too high a speed; the minimum-fuel descent profile of the Apollo lunar module onto the surface of the moon, subject to the lunar module not crashing and landing upright in a certain location; the Linear Regression (the linear model that minimizes the sum-squared residual); and the minimum cost road grating (cutting hills down and building up fills) that minimizes cost of the road subject to constraints on how quickly the road can turn or change elevation.

In addition or alternatively, the convex optimization logic can be used with an iterative optimization algorithm. For example, a gradient descent can be used, which is a first-order iterative optimization algorithm for finding the minimum of a function. In some examples, the gradient descent is used to find a local minimum of a function, which is the smallest value of the function with a given range. In general, to find a local minimum of a multi-variable function using gradient descent, steps are taken proportional to the negative of the gradient of the function at a current point. For example, if a multi-variable function is defined and differentiable in a neighborhood of a point, the function decreases fastest if one goes from that point in the direction of the negative gradient of the function at the point. This process (gradient descent) can take many iterations in sequence until it converges to a local minimum of the function. Alternatively, a global minimum is computed, which is the smallest value of the entire function. However, because the problem here is convex, any local minimum can be the global maximum.

In other words, an interior point method (a gradient descent) can be used to solve convex optimization problems. An interior point method is a linear or nonlinear programming method that achieves optimization by going through the middle of the solid defined by the problem rather than around its surface. One example of interior point method is Karmarkar's algorithm developed by Narendra Karmarkar, which is a method for linear programming which runs in probably polynomial time and is also very efficient in practice. It enabled solutions of linear programming problems that were beyond the capabilities of a simplex method. Contrary to the simplex method, Karmarkar's method can reach a best solution by traversing the interior of the feasible region. The method can be generalized to convex programming based on a self-concordant barrier function used to encode the convex set.

A convex optimization problem can be transformed into minimizing a linear function over a convex set by converting to the epigraph form. The idea of encoding the feasible set using a barrier and designing barrier methods was studied by Anthony V. Yurii Nesterov and Arkadi Nemirovski came up with a class of such barriers that can be used to encode any convex set. The number of iterations of the algorithm is bounded by a polynomial in the dimension and accuracy of the solution.

A convex optimization logic for determining an optimal operational schedule can be implemented with certain degrees of freedom in the multi-dimensional graph. For example, a convex optimization logic can have 240 degrees of freedom in the multi-dimensional graph. By way of example, a schedule can be come up with in 10-minute increments over the next 24 hour period, which results in 240 total sets of inputs. However, other degrees of freedom are possible, such as more degrees of freedom than 240 in case, for example, multiple rooms/coils are operated and controlled at the same time.

At 738, a minimum is identified in the multi-dimensional graph using the optimization algorithm. In some implementations, a local minimum in the multi-dimensional graph is identified using an iterative optimization algorithm. The local minimum indicates the minimum value with a predetermined range in the multi-dimensional graph. Such a predetermined range in the multi-dimensional graph can be adjusted.

At 740, an operational schedule among the candidate operational schedule, which corresponds with the identified minimum, is determined as an optimal operational schedule. Where a local minimum is identified, one of the candidate operational schedule that corresponds with the local minimum is determined as an optimal operational schedule.

At 742, the multi-dimensional graph can be calibrated over time. In some implementations, the multi-dimensional graph is calibrated at intervals (e.g., every 10 minutes, every hour, every day, every week, etc.) to reflect candidate operational schedules which changes and/or are newly generated based on varying factors over time (e.g., one or more factors represented by a thermal model, an energy cost model, and/or an environmental model). A calibrated multi-dimensional graph can be used to determine an updated optimal operational schedule through the processes discussed above, such as blocks 732 through 740.

FIG. 10 is a conceptual illustration of an example multi-dimensional graph 1000 to represent a plurality of candidate operational schedules. The graph 1000 has a plurality of vertices 1002 that correspond with candidate operational schedules. The vertices 1002 are also associated with costs of the respective candidate operational schedules. As described herein, the costs can represent efficiency of the respective candidate operational schedules when the respective candidate operational schedules are used to control a refrigeration system for a refrigeration facility. The costs can be calculated based on one or more factors, such as an energy cost and/or an energy consumption that incur when the refrigeration facility is operated using the respective candidate operational schedules.

In the graph 1000, a vertex 1010 is selected as a seed schedule, which has $C_{seed}$ as its cost. The seed schedule (vertex 1010) is compared with adjacent vertices to determine that a vertex 1012 (corresponding to operational schedule Sm having cost Cm) has a smallest cost among the vertex 1010 and its adjacent vertices. Then, the vertex 1012 is compared with adjacent vertices to determine that a vertex 1014 (corresponding to operational schedule $S_n$ having cost $C_n$) has a smallest cost among the vertex 1012 and its adjacent vertices. Then, the vertex 1014 is compared with adjacent vertices to determine that a vertex 1016 (corresponding to operational schedule $S_o$ having cost $C_o$) has a smallest cost among the vertex 1014 and its adjacent vertices. Lastly, the vertex 1016 is compared with adjacent vertices to determine that a vertex 1018 (corresponding to operational schedule $S_p$ having cost $C_p$) has a smallest cost among the vertex 1016 and its adjacent vertices. The vertex 1018 is determined as having the minimal cost (or the local minimum) in the graph 1000, and thus the operational schedule $S_p$ is selected as an optimal operational schedule for the refrigeration facility.

Figure 12:
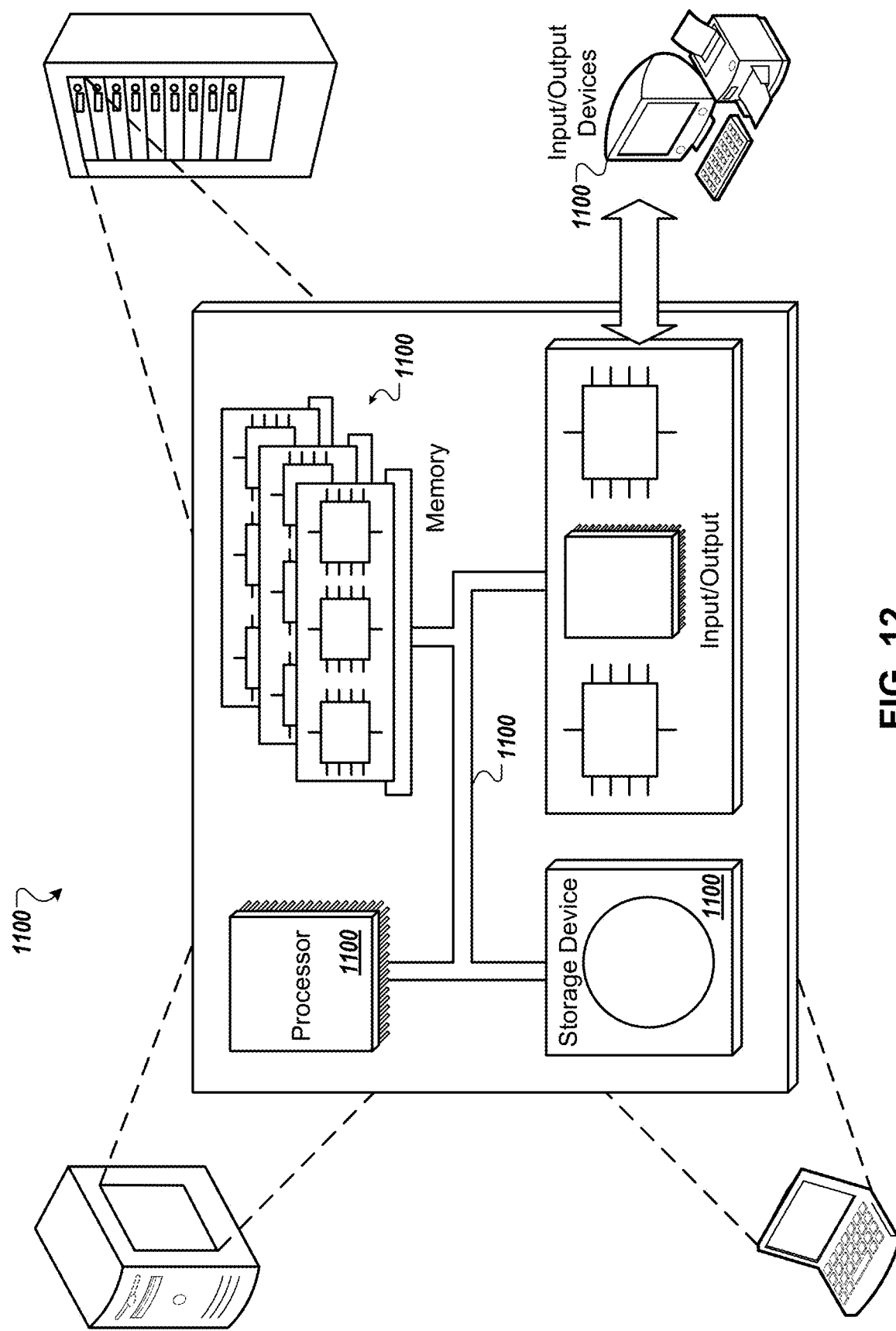
FIG. 12 is a schematic diagram of an example of a generic computer system

FIG. 12 is a schematic diagram of an example of a generic computer system 1100. The system 1100 can be used for the operations described in association with the methods 700, 800, and/or 900 according to one implementation. For example, the system 1100 may be included in either or all of the controller 132, the refrigeration system 130, the scheduler 140, the utility provider 160, the other information provider 170, the edge node controller 614, and the context cluster 640.

The system 1100 includes a processor 1110, a memory 1120, a storage device 1130, and an input/output device 1140. Each of the components 1110, 1120, 1130, and 1140 are interconnected using a system bus 1150. The processor 1110 is capable of processing instructions for execution within the system 1100. In one implementation, the processor 1110 is a single-threaded processor. In another implementation, the processor 1110 is a multi-threaded processor. The processor 1110 is capable of processing instructions stored in the memory 1120 or on the storage device 1130 to display graphical information for a user interface on the input/output device 1140.

The memory 1120 stores information within the system 1100. In one implementation, the memory 1120 is a computer-readable medium. In one implementation, the memory 1120 is a volatile memory unit. In another implementation, the memory 1120 is a non-volatile memory unit.

The storage device 1130 is capable of providing mass storage for the system 1100. In one implementation, the storage device 1130 is a computer-readable medium. In various different implementations, the storage device 1130 may be a floppy disk device, a hard disk device, an optical disk device, or a tape device.

The input/output device 1140 provides input/output operations for the system 1100. In one implementation, the input/output device 1140 includes a keyboard and/or pointing device. In another implementation, the input/output device 1140 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method for determining an operational schedule to control a refrigeration system for an enclosure, the method comprising:
    determining a thermal model of the enclosure and the refrigeration system, the thermal model modeling one or more thermal properties of the enclosure and the refrigeration system under varied use and environmental conditions;
    obtaining at least one of an energy cost model and an environmental model, wherein the energy cost model includes a schedule of projected energy costs for a predetermined period of future time, wherein the environmental model includes one or more projected external environmental conditions in a geographic area where the enclosure is located for the predetermined period of future time;
    determining the operational schedule to control the refrigeration system over the predetermined period of future time by:
        generating a plurality of candidate schedules for controlling the refrigeration system for the predetermined period of future time, the plurality of candidate schedules determined based on a combination of the thermal model, the energy cost model, and the environmental model, wherein each of the plurality of candidate schedules provides a different schedule of, at least, operation levels for the refrigeration system over the predetermined period of future time;
        generating a multi-dimensional graph providing costs for cooling the enclosure according to the plurality of candidate schedules;
        randomly selecting a seed schedule from the plurality of candidate schedules;
        evaluating the seed schedule in the multi-dimensional graph using an iterative optimization algorithm; and
        selecting the operational schedule that provides an optimal cost from among the plurality of candidate schedules, the optimal cost corresponding to a local minimum of the costs identified when starting with the seed schedule in the multi-dimensional graph; and
    controlling the refrigeration system over the predetermined period of future time according to the determined operational schedule.

2. The method of claim 1, wherein each of the costs in the multi-dimensional graph represent a combination of an energy cost and an energy consumption according to each of the plurality of candidate schedules.

3. The method of claim 1, further comprising calibrating the multi-dimensional graph at predetermined time intervals based on changes made to the plurality of candidate schedules over the predetermined period of future time.

4. The method of claim 1, further comprising generating the plurality of candidate schedules at one or more predetermined points in time over the predetermined period of future time.

5. The method of claim 1, wherein the costs represent efficiency of the plurality of candidate schedules in controlling the refrigeration system when the plurality of candidate schedules are executed.

6. The method of claim 1, wherein the costs represent an energy cost according to each of the plurality of candidate schedules.

7. The method of claim 1, wherein evaluating the seed schedule comprises comparing a cost of the seed schedule to costs of the plurality of candidate schedules to identify at least one of the plurality of candidate schedules having a minimal cost.

8. The method of claim 7, wherein the at least one of the plurality of candidate schedules has the minimal cost among all of the plurality of candidate schedules.

9. The method of claim 7, wherein the at least one of the plurality of candidate schedules has the minimal cost among a subset of the plurality of candidate schedules.

10. A cold storage facility comprising:
    a cold storage enclosure defining a space for content;
    a refrigeration system configured to cool the enclosed space;
    a plurality of sensors configured to sense temperatures at locations within the enclosed space, and detect parameters of the refrigeration system; and
    a processor configured to perform operations comprising:
        determining a thermal model of the enclosure and the refrigeration system, the thermal model modeling one or more thermal properties of the enclosure and the refrigeration system under varied use and environmental conditions;
        obtaining at least one of an energy cost model and an environmental model, wherein the energy cost model includes a schedule of projected energy costs for a predetermined period of future time, wherein the environmental model includes one or more projected external environmental conditions in a geographic area where the enclosure is located for the predetermined period of future time;
        determining the operational schedule to control the refrigeration system over the predetermined period of future time by:
            generating a plurality of candidate schedules for controlling the refrigeration system for the predetermined period of future time, the plurality of candidate schedules determined based on a combination the thermal model, the energy cost model, and the environmental model;
            generating a multi-dimensional graph providing costs for cooling the enclosure according to the plurality of candidate schedules;
            randomly selecting a seed schedule from the plurality of candidate schedules;
            evaluating the seed schedule in the multi-dimensional graph using an iterative optimization algorithm; and
            selecting the operational schedule that provides an optimal cost from among the plurality of candidate schedules; and
    a controller configured to control the refrigeration system over the over the predetermined period of future time according to the determined operational schedule.

11. The cold storage facility of claim 10, wherein each of the costs in the multi-dimensional graph represent a combination of an energy cost and an energy consumption according to each of the plurality of candidate schedules.

12. The cold storage facility of claim 10, the operations further comprising: calibrating the multi-dimensional graph at predetermined time intervals based on changes made to the plurality of candidate schedules over the predetermined period of future time.

13. The cold storage facility of claim 10, wherein evaluating the seed schedule comprises comparing a cost of the seed schedule to costs of the plurality of candidate schedules to identify at least one of the plurality of candidate schedules having a minimal cost.

14. A cold storage management computer system for controlling a refrigeration system for an enclosure, the cold storage management computer system comprising:
one or more processors; and
memory storing instructions that when executed by the one or more processors cause the one or more processors to perform operations comprising:
receiving, from a control system, a request for an operational schedule for the refrigeration system;
determining a thermal model of the enclosure and the refrigeration system, the thermal model modeling one or more thermal properties of the enclosure and the refrigeration system under varied use and environmental conditions;
obtaining at least one of an energy cost model and an environmental model, wherein the energy cost model includes a schedule of projected energy costs for a predetermined period of future time, wherein the environmental model includes one or more projected external environmental conditions in a geographic area where the enclosure is located for the predetermined period of future time;
determining the operational schedule to control the refrigeration system over the predetermined period of future time by:
generating a plurality of candidate schedules for controlling the refrigeration system for the predetermined period of future time, the plurality of candidate schedules determined based on a combination of the thermal model, the energy cost model, and the environmental model;
generating a multi-dimensional graph providing costs for cooling the enclosure according to the plurality of candidate schedules;
randomly selecting a seed schedule from the plurality of candidate schedules;
evaluating the seed schedule in the multi-dimensional graph using an iterative optimization algorithm; and
selecting the operational schedule that provides an optimal cost from among the plurality of candidate schedules, the optimal cost corresponding to a local minimum of the costs identified when starting with the seed schedule in the multi-dimensional graph.

15. The cold storage management computer system of claim 14, wherein each of the costs in the multi-dimensional graph represent a combination of an energy cost and an energy consumption according to each of the plurality of candidate schedules.

16. The cold storage management computer system of claim 14, the operations further comprising: calibrating the multi-dimensional graph at predetermined time intervals based on changes made to the plurality of candidate schedules over the predetermined period of future time.

17. The cold storage management computer system of claim 14, wherein evaluating the seed schedule comprises comparing a cost of the seed schedule to costs of the plurality of candidate schedules to identify at least one of the plurality of candidate schedules having a minimal cost.

18. A cold storage control system for controlling cooling of a cold storage facility, the cold storage control system comprising:
one or more processors;
an interface that transmits and receives data over one or more networks;
one or more input ports configured to receive sensor signals from a plurality of sensors, the plurality of sensors configured to sense temperatures at locations within the cold storage facility, and detect parameters of a refrigeration system;
one or more output ports configured to trigger operation of the refrigeration system configured to cool the cold storage facility; and
memory storing instructions that when executed by the one or more processors cause the one or more processors to perform operations comprising:
transmitting, over the one or more networks, a request for an operational schedule for the refrigeration system;
receiving, in response to the request, the operational schedule determined by:
generating a plurality of candidate schedules for controlling the refrigeration system for the predetermined period of future time, the plurality of candidate schedules determined based on a combination of a thermal model, an energy cost model, and an environmental model of at least one of the enclosure and the refrigeration system;
generating a multi-dimensional graph providing costs for cooling the enclosure according to the plurality of candidate schedules;
randomly selecting a seed schedule from the plurality of candidate schedules;
evaluating the seed schedule in the multi-dimensional graph using an iterative optimization algorithm; and
selecting the operational schedule that provides an optimal cost from among the plurality of candidate schedules, the optimal cost corresponding to a local minimum of the costs identified when starting with the seed schedule in the multi-dimensional graph; and
a controller configured to control the refrigeration system over the predetermined period of future time according to the operational schedule.

19. The cold storage control system of claim 18, wherein each of the costs in the multi-dimensional graph represent a combination of an energy cost and an energy consumption according to each of the plurality of candidate schedules.

20. The cold storage control system of claim 18, wherein evaluating the seed schedule comprises comparing a cost of the seed schedule to costs of the plurality of candidate schedules to identify at least one of the plurality of candidate schedules having a minimal cost.

* * * * *